US010194291B1

(12) United States Patent
Andrews et al.

(10) Patent No.: US 10,194,291 B1
(45) Date of Patent: *Jan. 29, 2019

(54) SYSTEM FOR LOCATION BASED TRIGGERS FOR MOBILE DEVICES

(71) Applicants: Sozo Innovations, LLC, Petaluma, CA (US); Inventero, LLC, Richmond, CA (US)

(72) Inventors: Scott Sturges Andrews, Petaluma, CA (US); Axel Fuchs, Richmond, CA (US)

(73) Assignee: Dyfan, LLC, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,758

(22) Filed: Apr. 6, 2018

Related U.S. Application Data

(63) Continuation of application No. 15/785,369, filed on Oct. 16, 2017, now Pat. No. 9,973,899, which is a continuation of application No. 13/410,197, filed on Mar. 1, 2012.

(60) Provisional application No. 61/517,584, filed on Mar. 1, 2011.

(51) Int. Cl.
| | |
|---|---|
| *H04W 4/33* | (2018.01) |
| *H04W 4/12* | (2009.01) |
| *H04W 4/80* | (2018.01) |
| *G06F 3/0484* | (2013.01) |

(52) U.S. Cl.
CPC .............. *H04W 4/33* (2018.02); *H04W 4/12* (2013.01); *H04W 4/80* (2018.02); *G06F 3/04842* (2013.01); *G06F 3/04847* (2013.01)

(58) Field of Classification Search
None
See application file for complete search history.

(56) References Cited

U.S. PATENT DOCUMENTS

| | | | | |
|---|---|---|---|---|
| 6,664,925 | B1 * | 12/2003 | Moore ..................... | G01S 5/02 342/450 |
| 7,200,387 | B1 * | 4/2007 | Ephraim .......... | H04M 1/72572 455/404.2 |
| 7,308,273 | B2 * | 12/2007 | Zhang ................... | H04W 64/00 370/338 |
| 8,571,602 | B2 * | 10/2013 | Horton ............... | H04N 1/00132 358/1.15 |
| 9,749,823 | B2 * | 8/2017 | Rowe ..................... | H04W 4/18 |
| 2001/0048746 | A1 * | 12/2001 | Dooley ................. | G01S 5/0072 380/258 |
| 2006/0099963 | A1 * | 5/2006 | Stephens ................ | H04W 4/02 455/456.3 |
| 2010/0197323 | A1 * | 8/2010 | Freeburg ................ | H04W 4/02 455/456.2 |

(Continued)

*Primary Examiner* — Muthuswamy Manoharan
(74) *Attorney, Agent, or Firm* — Patrick E. Caldwell, Esq.; The Caldwell Firm, LLC

(57) ABSTRACT

Various systems are provided comprising: a building including one or more facilities each including at least one broadcast short-range communications unit having a fixed location, an application/computer code configured for execution by at least one of a plurality of mobile devices, and at least one server, that, together, are configured to cooperate to trigger one or more mobile device actions including causing to be output visual information, based on particular location-relevant information that is, in turn, based on at least one value.

27 Claims, 21 Drawing Sheets

(56) References Cited

U.S. PATENT DOCUMENTS

2010/0274475 A1* 10/2010 Antonenco ............ G01C 21/20
701/533
2012/0115512 A1* 5/2012 Grainger ............... G01S 5/0257
455/456.3

* cited by examiner

FIGURE 16

SYSTEM FOR LOCATION BASED TRIGGERS FOR MOBILE DEVICES

RELATED APPLICATION(S)

The present application is a continuation of U.S. application Ser. No. 15/785,369 filed Oct. 16, 2017 which, in turn, is a continuation of U.S. application Ser. No. 13/410,197 filed Mar. 1, 2012 which, in turn, claims the priority of a previously filed U.S. Provisional Application filed Mar. 1, 2011 under Ser. No. 61/517,584, each of which are incorporated herein by reference in their entirety.

BACKGROUND AND FIELD OF THE INVENTION

The present invention relates to network communications, and more particularly to network communications with mobile devices.

SUMMARY

In one possible embodiment, a system is provided, comprising: a building including a plurality of facilities therein each including at least one broadcast short-range communications unit having a fixed location and configured to: generate one or more broadcast messages including an address portion and a plurality of fields including at least one field with at least one value, broadcast, via a first wireless communications protocol, the one or more broadcast messages including the address portion, the plurality of fields, and the at least one value, for intended receipt by a plurality of mobile devices in a communication range of the at least one broadcast short-range communications unit, and re-broadcast, via the first wireless communications protocol, the one or more broadcast messages including the address portion, the plurality of fields, and the at least one value, for intended receipt by the plurality of mobile devices in the communication range of the at least one broadcast short-range communications unit; code configured to be executed by at least one of the plurality of mobile devices, the code, when executed, configured to: cause display, via a display of the at least one mobile device, of an option for causing to be output, via the at least one mobile device, visual information, receive an indication of a user input for the option displayed via the display of the at least one mobile device, receive an indication of a receipt, from the at least one broadcast short-range communications unit and via the first wireless communications protocol, of the one or more broadcast messages including the address portion, the plurality of fields, and the at least one value, and cause to be sent, from the at least one mobile device and via a second wireless communications protocol and an Internet Protocol, at least one message; and at least one server configured to: receive, from the at least one mobile device and via the Internet protocol, the at least one message, in response to the receipt, from the at least one mobile device and via the Internet protocol, of the at least one message: retrieve location-relevant information, and after the location-relevant information is retrieved, cause to be sent, from the at least one server to the at least one mobile device and via the Internet protocol, a response message including the location-relevant information; said code, when executed, further configured to: receive, from the at least one server and via the second wireless communications protocol and the Internet Protocol, the response message including the location-relevant information, and after the receipt, from the at least one server and via the second wireless communications protocol, of the response message including the location-relevant information: cause to be output, via the at least one mobile device, the visual information based on the location-relevant information; wherein the system is configured such that the location-relevant information includes at least one image, and the system is further configured such that, after the indication of the user input is received and after the output of the visual information is caused, subsequent output of different visual information is caused as the at least one mobile device is moved among the plurality of the facilities of the building.

In other embodiments, different systems are provided which omit one or more features of the previous embodiment(s). Further, in some embodiments, the first wireless communications protocol may be configured for communicating on a low-bandwidth sensor network and the second wireless communications protocol is configured for communicating on a WiFi or cellular network. Still yet, in other embodiments, the first wireless communications protocol may be configured for communicating on a personal area— or 802.15—network and the second wireless communications protocol is configured for communicating on a WiFi or cellular network.

BRIEF DESCRIPTION OF THE DRAWINGS

FIG. 16 illustrates an attribute interface, in accordance with another embodiment.

DETAILED DESCRIPTION

Figure 1:
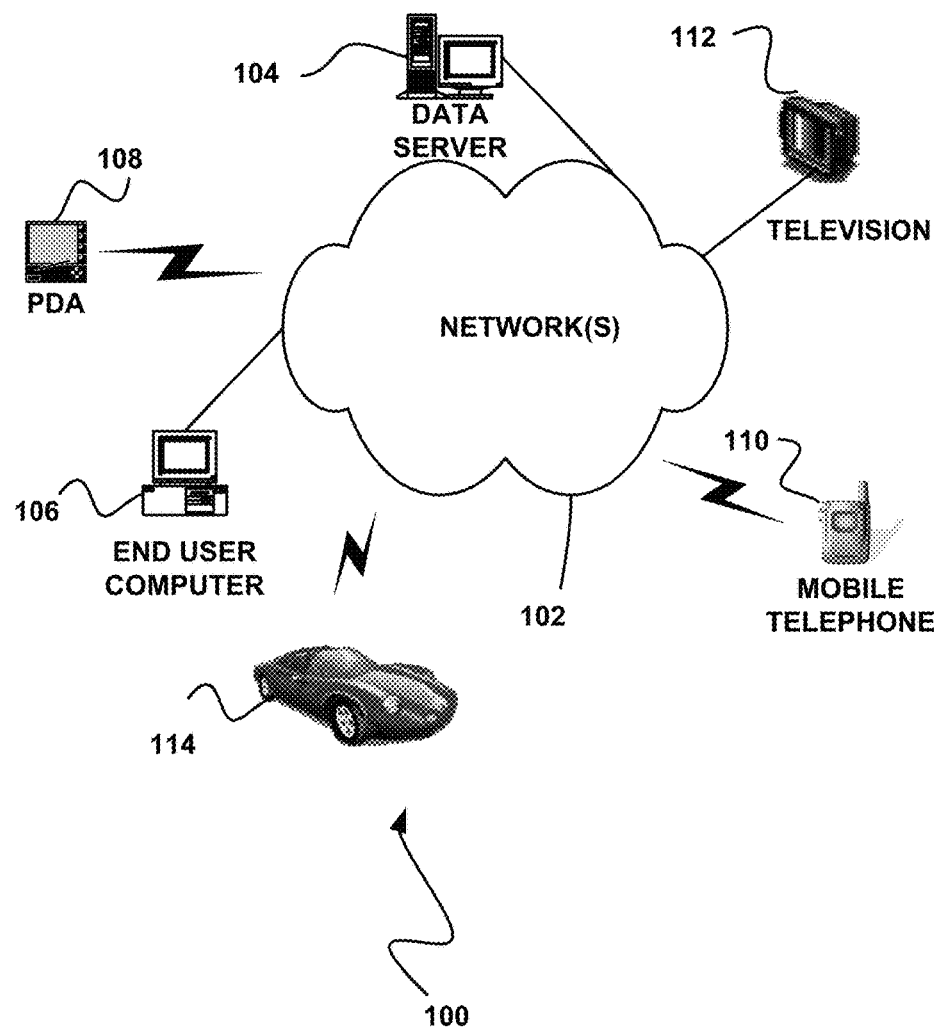
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, a vehicle 114, etc.

Figure 2:
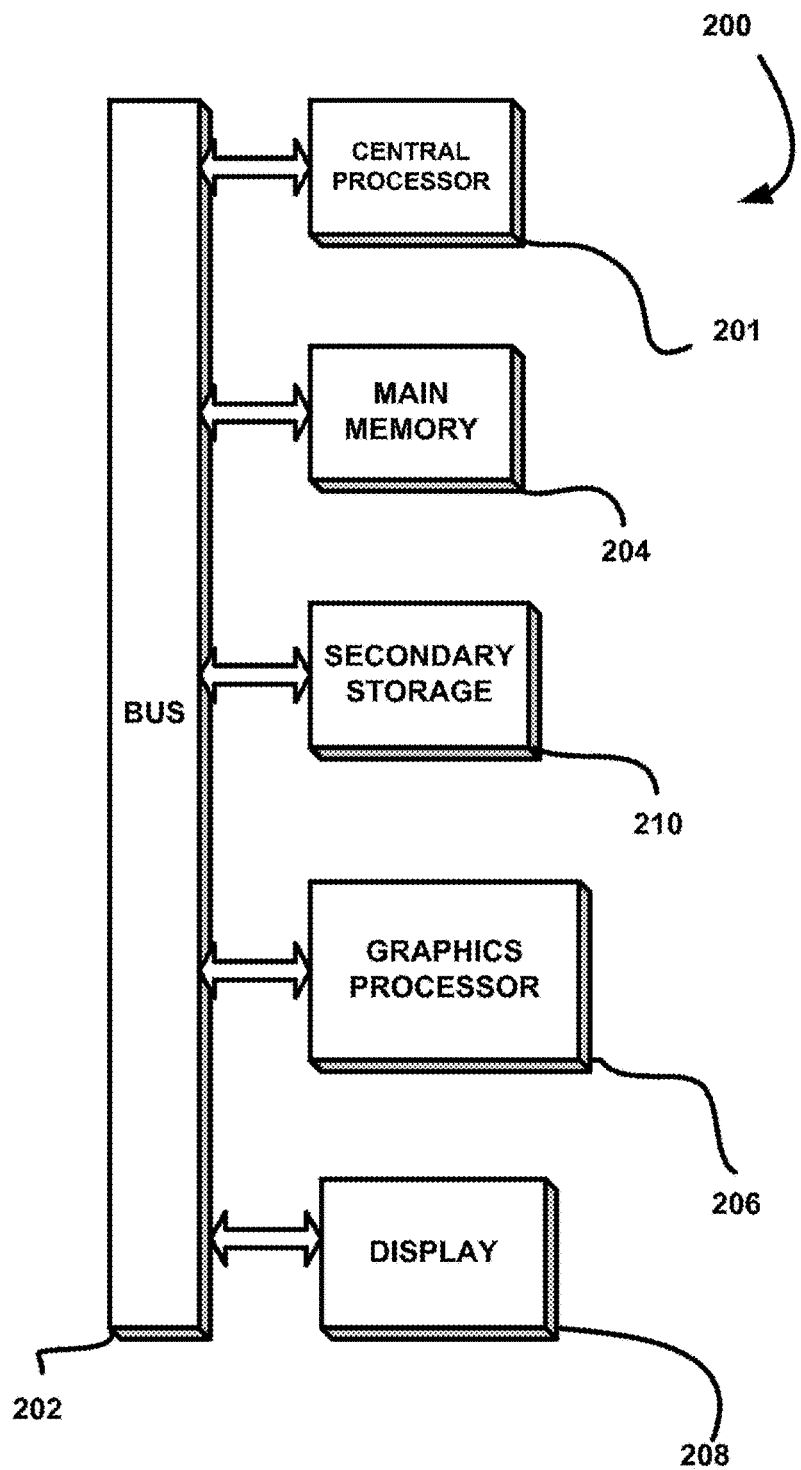
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
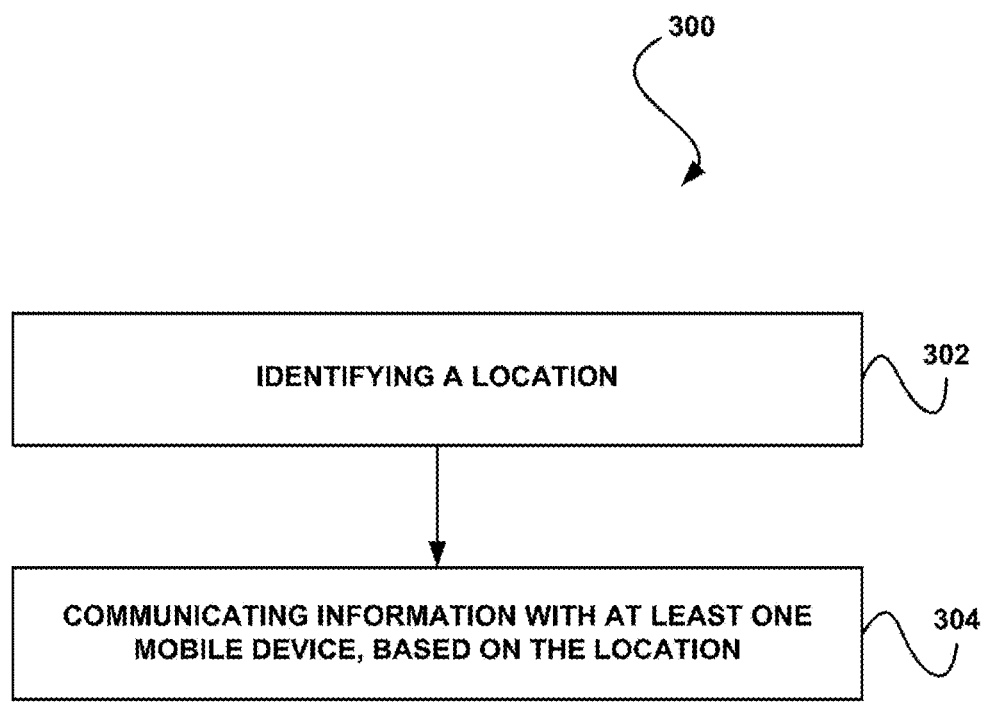
FIG. 3 illustrates a method providing a location based trigger for a mobile device, in accordance with one embodiment.

FIG. 3 illustrates a method 300 providing a location based trigger for a mobile device, in accordance with one embodiment. As an option, the method 300 may be implemented in the context of the architecture and environment of the previous Figures and/or any subsequent Figure(s). Of course, however, the method 300 may be carried out in any desired environment. Further, the aforementioned definitions may equally apply to the description below.

As shown in operation 302, a location is identified. In the context of the present description, such location may include any location and may be identified in any desired manner. For example, the location may be a point (e.g. a particular geographical coordinates), an area (e.g. a set of geographical coordinates, a city, etc.), a volume, a road (or segment thereof), a place of business, a road intersection, a landmark, and/or any other location described herein.

As a further option, the location may be a location that has been predetermined. For example, the location may be one of a plurality of predetermined locations. Such predetermined location(s) may be configured by a user of the mobile device, a content and/or service provider, etc. Furthermore, the location(s) may be predetermined by a content and/or service provider, exemplary reasons for which will be set forth more detail below.

As yet another option, the location may be one having at least one predetermined physical and/or logical attribute. For example, the physical attribute may be an address or other geographic coordinates, a region defined by physical boundaries (e.g. a shopping center, a sports venue, a political region such as a city or county, etc.). As other examples, the logical attributes may be types of venues (e.g. sports facilities, theatres, parks, etc.), categories of retail stores or service venues (e.g. shoe stores, drug stores, clothing stores, hobby stores, sports clubs, etc.), facilities associated with specific brands (e.g. all facilities associated with a given brand or company), locations associated with specified attributes such as places where a specified density of people meeting some specified demographic (e.g. age, gender, hobbies, interests, friends, etc.), etc.

Moreover, the location may be identified in any manner. In one embodiment, the location may be identified by being received. Just by way of example, it may be received by a network component that is separate from the mobile device, and optionally in communication with the mobile device (e.g. via a network, such as any of the networks described above with reference to FIG. 1). As another example, the location may be received from/utilizing the mobile device.

In another embodiment, the location may be identified by querying a database (e.g. for a location of the mobile device, for mobile devices at the location, etc.). For example, the database may store mobile device locations. Such mobile device locations stored in the database may be periodically updated, updated in response to a change in location of mobile devices, etc. In this way, the location may be identified by as a result of the query to the database indicating that the mobile device is present at the location In yet another embodiment, the location may be identified utilizing a global positioning system (GPS), digital map, or any other location identifying device. Thus, as an option, the location identifying device may be a component of the mobile device. Of course, however, the location identifying device may or may not be associated with the mobile device in any manner.

Further, as shown in operation 304, information is communicated with at least one mobile device, based on the location. In the context of the present description, the mobile device (or otherwise referred to as mobile device) may be any device with mobile communication capabilities. For example, the mobile device may be a wireless PDA, a mobile phone device, a wireless tablet computer, a smartphone, a wireless navigation device, a vehicle (such as a boat, car, plane, train, etc.), etc. It should be noted that while only one mobile device is referenced below, the present method 300 may be used with respect to a plurality of mobile devices, in other embodiments.

Also in the context of the present description, the information may be any type of information capable of being communicated (e.g. provisioned, transmitted, broadcasted, messaged, displayed, etc.) with respect to the mobile device. Just by way of example, the information may be content (e.g. an advertisement, coupon, digital media, etc.). As another example, the information may be a service (e.g. mobile communications service, etc.).

It should be noted that the communication of the information may involve any type of communication enabled with respect to the mobile device. For example, the communication may involve a wireless communication protocol. In various embodiments, the communication may include broadcasting the information (i.e. broadcast communications), addressing the information (i.e. addressed communications), etc.

In one embodiment, the information may be communicated by receiving the information. Optionally, the mobile device may receive the information (e.g. from the network component, another mobile device, etc.). As another option, the network component may receive the information (e.g. from the mobile device).

In another embodiment, the information may be communicated by sending the information. Optionally, the mobile device may send the information (e.g. to the network component, to another mobile device, etc.). As another option, the network component may send the information (e.g. to the mobile device).

In yet another embodiment, the information may be communicated by displaying the information. For example, the information may be displayed on the mobile device, on the network device, etc. Such display of the information may be accomplished using a graphical user interface presenting the information on a display screen of the mobile device, network device, etc.

As noted above, the information is communicated with the mobile device, based on the location. As an option, in one embodiment, the location may be the basis of communicating the information such that the information is only communicated with the mobile device as a result of a determination that the mobile device is present at the (e.g. predetermined) location. Thus, the information may optionally be communicated specifically with respect to the location at which the mobile device is present.

As another option, the location may be the basis of communicating the information such that the information is communicated based on a determination that the mobile device is present at the (e.g. predetermined) location. For example, the information may be communicated with an identification of the location at which the mobile device has been indicated as being present. Of course, however, the information may be communicated with the mobile device in any manner that is based on the location.

As a further option, the information may be communicated (e.g. with the mobile device) based on other factors. In various embodiments, such factor(s) may include a preference of a user of the mobile device, a profile of such user, a requirement of the information (e.g. as configured by a provider of the information), and/or any other parameter, data, etc. capable of being a basis for the communication of the information.

To this end, information is communicated with a mobile device, based on an identified location. In one embodiment, the mobile device, the network component, etc. may operate to identify the location (operation 302) and communicate information with the mobile device based on the location (operation 304). Thus, for example, a computer program product having code, which when executed by a processor, performs operations 302-304 may be resident on the mobile device, the network component, etc.

More illustrative information will now be set forth regarding various optional architectures and features with which the foregoing techniques discussed in the context of any of the present or previous figure(s) may or may not be implemented, per the desires of the user. For instance, various optional examples and/or options associated with the location identification of operation 302, the information communication of operation 304, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 4:
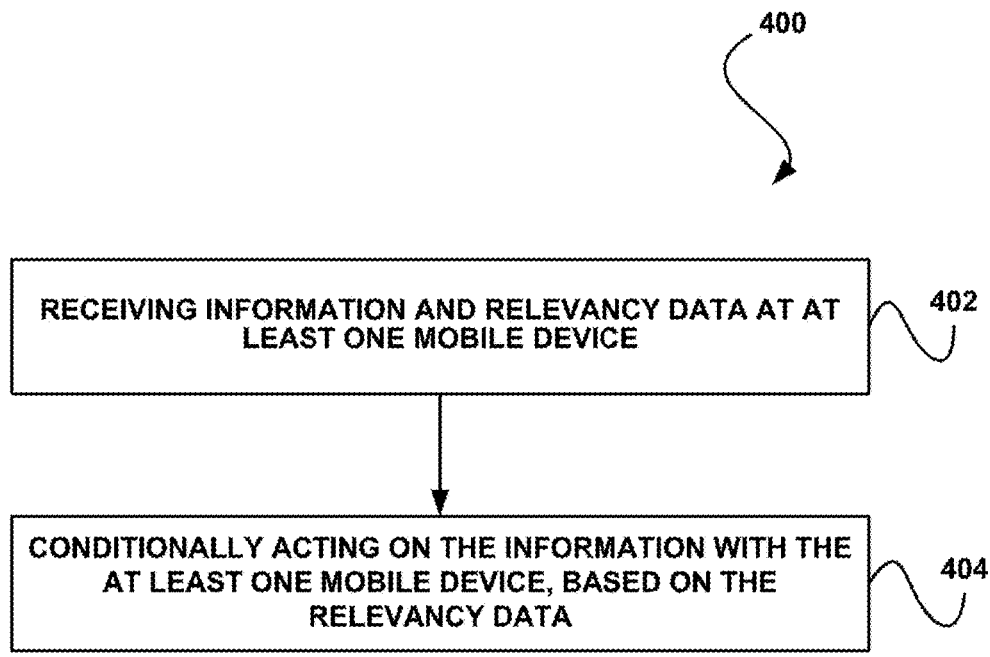
FIG. 4 illustrates a method providing a relevancy based trigger for a mobile device, in accordance with another embodiment.

FIG. 4 illustrates a method 400 providing a relevancy based trigger for a mobile device, in accordance with another embodiment. As an option, the method 400 may be implemented in the context of the architecture and environment of the previous Figures and/or any subsequent Figure(s). Of course, however, the method 400 may be carried out in any desired environment. Further, the aforementioned definitions may equally apply to the description below.

As shown in operation 402, information and relevancy data is received at at least one mobile device.

While the information and relevancy data may be received from any device and/or network component, in accordance with one possible embodiment, the information and relevancy data may be received from at least one other mobile device. In such embodiment, the mobile devices may be any devices each having mobile communication capabilities such that the information may be received at the one mobile device from the other mobile device. As an option, the mobile devices may each be controlled by a user of a respective one of the mobile devices. In the present embodiment, the information may be received at the one mobile device directly from the other mobile device (i.e. without passing through an intermediary network component). With respect to such embodiment, the mobile devices may be in communication with each other to allow the one mobile device to directly receive the information from the other mobile device. For example, the mobile devices may be in communication via a single network. Of course, the information may be received at the one mobile device indirectly from the other mobile device (i.e. by passing through at least one intermediary network component). With respect to such embodiment, the mobile devices may optionally only be in communication with each other indirectly to allow the one mobile device to indirectly receive the information from the other mobile device. For example, the mobile devices may be in communication via multiple networks (e.g. with the one mobile device located on one network and the other mobile device located on another network).

In another embodiment, the information may be received at the one mobile device from a broadcast of the information sent from any device (e.g. mobile device, network component, etc.). In another embodiment, the information may be received at the one mobile device via a message specifically targeting the one mobile device. Of course, however, the information may be received via any type of communication (e.g. any protocol, etc.).

Additionally, the information that is received at the one mobile device may be any type of information capable of being communicated between the mobile devices. For example, the information may be content, such as an advertisement, coupon, digital media, a message, etc.

Further, as shown in operation 404, the information is conditionally acted upon with the at least one mobile device, based on the relevancy data. In the context of the present description, such action may include displaying, communicating (e.g. sending and/or receiving, etc.), storing, and/or any other act capable of being carried out, at least in part, by a mobile device. In the case of displaying, such display of the information may be accomplished using a graphical user interface presenting the information on a display screen of the mobile device, for example. In this way, the display may allow a user of the mobile device to view the information.

As noted above, the action on the information is conditional based on the relevancy data. Such relevancy data may include any data that is related to relevancy of the information with respect to one or more mobile devices and/or users. For instance, such relevancy may be with respect to any criteria (e.g. aspect such as location, service, etc.) associated with the mobile device or user thereof. For example, only information determined to be relevant may be displayed with the mobile device receiving such information.

In one embodiment, the relevancy may be determined based on a location of the at least one mobile device. The location of the mobile device may be determined, for example, using a location identifying device (e.g. GPS) associated with the mobile device, querying a database for the location of the mobile device, etc. In addition, the information may be predetermined to be relevant to a location or multiple locations, such that the information may only be determined to be relevant, and thus acted upon with the mobile device, when the mobile device is located at the relevant location (or in the event of multiple specific locations, when the mobile device is located at one of the relevant locations).

In another embodiment, the relevancy may be determined based on a preference of a user of the mobile device. The preference may be determined from input of the user, a profile of the user, etc. Furthermore, the information may be predetermined to be relevant to a preference or multiple preferences. In this way, the information may be acted upon with the mobile device, when the preference of the user is a relevant preference (or in the case of multiple relevant preferences, is one of the relevant preferences).

While various examples of criteria that may be used for determining the relevancy of the information are described above, it should be noted that the criteria may be used in any desired manner to determine the relevancy of the information. For example, a valuation of the criteria may be used to determine the relevancy of the information (e.g. by comparing the same to a threshold, by applying a function thereto, etc.). As another example, a rule establishing (e.g. requirements of, etc.) relevancy may be applied to the criteria to determine the relevancy of the information.

To this end, information received at a mobile device from at least one other mobile device may be conditionally displayed with the one mobile device, based on a relevancy thereof. This may allow information to be communicated between mobile devices, where information received at one mobile device from another mobile device is only presented to a user of the one mobile device that received the information when the information is determined to be relevant.

More illustrative information will now be set forth regarding various optional architectures and features with which the foregoing techniques discussed in the context of any of the present or previous figure(s) may or may not be implemented, per the desires of the user. For instance, various optional examples and/or options associated with the information receipt of operation 402, the information display of operation 404, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 5:
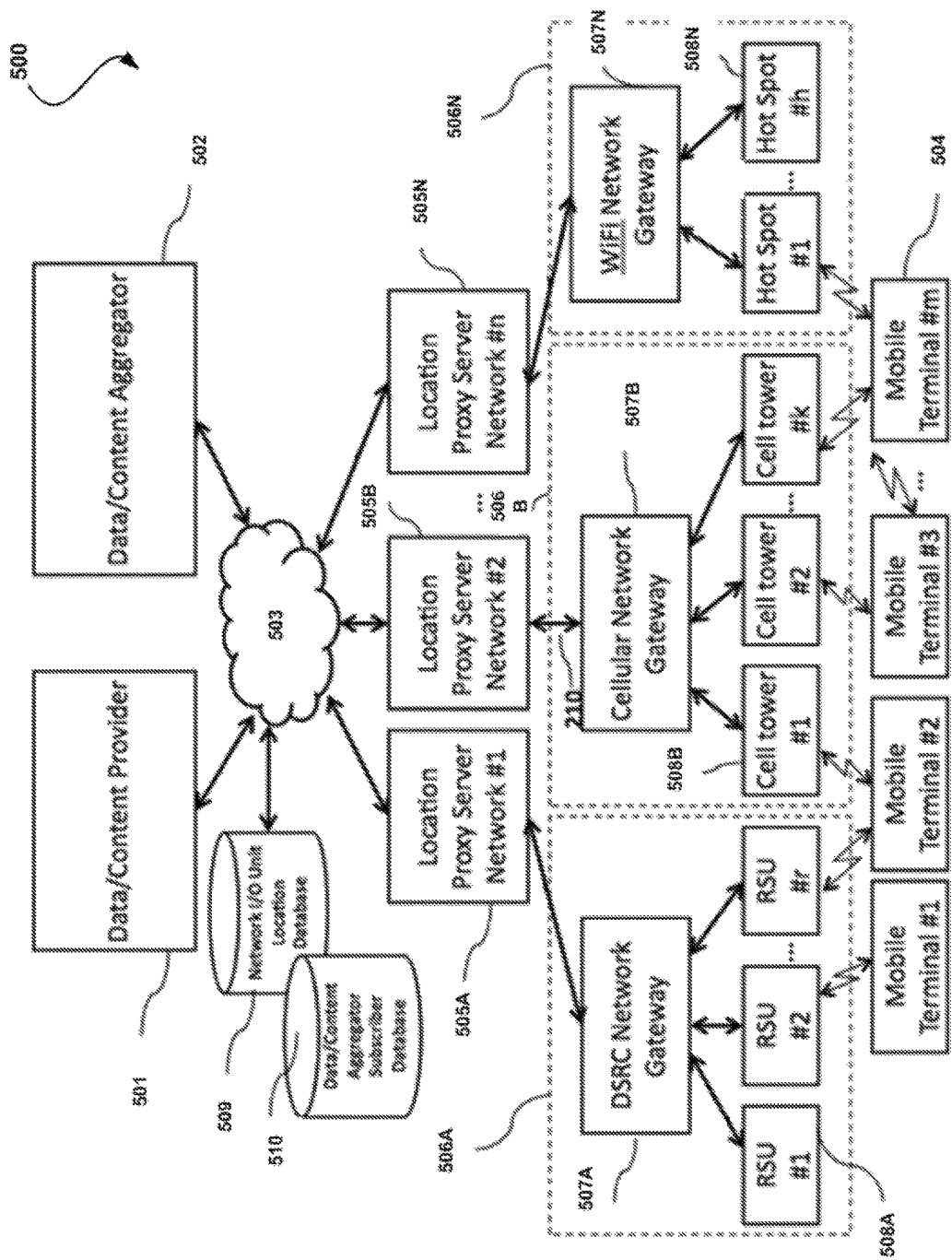
FIG. 5 illustrates a system for location and/or relevancy based triggers for mobile devices, in accordance with yet another embodiment.

FIG. 5 illustrates a system 500 for location and/or relevancy based triggers for mobile devices, in accordance with yet another embodiment. As an option, the system 500 may be implemented in the context of the architecture and environment of the previous Figures and/or any subsequent Figure(s). Of course, however, the system 500 may be implemented in any desired environment. Again, the aforementioned definitions may equally apply to the description below.

As shown, one or more data/content providers 501 and one or more data/content aggregators 502 communicate with one or more mobile networks 506A-N. As also shown, the data/content providers 501 and data/content aggregators 502 communicate via a broadband backhaul infrastructure 503 [e.g. using any desired protocol 504, such as Internet Protocol (IP) over the broadband backhaul infrastructure 503]. Thus, the data/content providers 501 and data/content aggregators 502 may be located on other networks (not shown) which are separate from, but in communication with the mobile networks 506A-N for indirect communication with the same via the broadband backhaul infrastructure 503.

Of course, it should be noted that the broadband backhaul infrastructure 503 may be any platform, network(s) (such as the Internet), etc. enabling communication between each of the data/content providers 501 and data/content aggregators 502 with the mobile networks 506A-N. It should also be noted that such mobile networks 506A-N may be any networks establishing wireless communications between the various network components described herein. For example, the mobile networks 506A-N may include WiFi hotspots (IEEE 802.11), Wimax (IEEE 802.16), ad hoc networks (based on 802.11 or 802.11 derivatives such as DSRC, cellular networks (2G: CDMA, GSM; 2.5G: GPRS, 1×RT, EDGE; 3G: CDMA-2000, WCDMA, UMTS; 4G: LTE).

In the present embodiment, the data/content providers 501 may be any network components capable of provisioning content over the mobile networks 506A-N. For example, the data/content providers 501 may store the content for provisioning the same over the mobile networks 506A-N. As another example, the data/content providers 501 may provision services for communicating the content over the mobile networks 506A-N. Such content may be provisioned over the mobile networks 506A-N to various mobile devices 504, or any other network components, described below.

Also in the present embodiment, the data/content aggregators 502 may be any network components capable of receiving content over the mobile networks 506A-N. For example, the data/content aggregators 502 may receive the content over the mobile networks 506A-N for storing, aggregating, analyzing, forwarding, etc. such content. Optionally, the data/content aggregators 502 may receive the content from the various mobile devices 504, or any other network components, described below.

As also shown, a location proxy server 505A-N at each of the mobile networks 506A-N is in communication with the data/content providers 501 and data/content aggregators 502 via the broadband backhaul infrastructure 503. The location proxy servers 505A-N may each be any network component that proxies communications for a respective one of the mobile networks 506A-N. In another embodiment (not shown), a single one of the location proxy servers 505A-N may serve multiple of the mobile networks 506A-N, and therefore provide data routing to and from the multiple of the mobile networks 506A-N. In yet another embodiment (also not shown), the location proxy servers 505A-N may be integrated with (i.e. not separate from) network specific gateways 507A-N described below. For that matter, any of the components shown in the present Figure may or may not be integrated with any one or more of the remaining components.

The location proxy servers 505A-N may be aware of location and/or place attributes of each of a plurality of network information outlets 508A-N. For example, the location proxy servers 505A-N may be in communication with one or more location databases 509 containing address tables that may be used by location proxy servers 505A-N to allow a cross reference between the network addresses of the network information outlets 508A-N and the location and/or place attributes of such network information outlets 508A-N. Optionally, the location and place attributes of the network information outlets 508A-N may be provided to the location databases 509 by the network information outlets 508A-N, through a manual entry by a system administrator, or may be automatically acquired through manual or automated cross referencing of the location of the network information outlets 508A-N and other geographic and business information. In another embodiment, such information may collected in connection with a subscription and/or registration process involving the network information outlets 508A-N and/or any of the other components shown in the present Figure.

In addition, the location proxy servers 505A-N may be in communication with one or more subscriber databases 510 containing information about the data/content aggregators 502 relating to service and location attributes of interest as specified by those data/content aggregators 502. It should be noted that while shown separate, the location database(s) 509 may be integrated with each of the location proxy servers 505A-N, or they may be remotely connected by way of a network, and/or they may be distributed across a plurality of sites.

Further, as shown, a network gateway 507A-N is provided for each wireless network 506A-N. The network gateways 507A-N may be utilized to route information from the broadband backhaul infrastructure 503 to a specific mobile device 504 or to a group of mobile devices 504 within the respective mobile network 506A-N. The network gateways 507A-N may also optionally be integrated with the network information outlets 508A-N and directly connected to the broadband backhaul infrastructure 503 or to an Internet service provider.

The network information outlets 508A-N, which may also be referred to herein as network I/O units, may include for example Dedicated short-range communications (DSRC) roadside units (RSU) 508A for a DSRC network 506A, cellular towers 508B for a cellular network 506B, and WiFi hot spots 508N for a WiFi Network 506N. Each of the network information outlets 508A-N may be fixed at a certain location, and each may be associated with at least a location attribute, and optionally additional place attributes.

The network information outlets 508A-N may directly communicate with the mobile devices 504 over a wireless transceiver, and may be connected to an associated one of the network gateways 507A-N via open or proprietary backhaul networks. It should be noted that the wireless networks 506A-N may each be of any type that supports addressed and/or broadcast data communications. Thus, the mobile devices 504 may connect to one or more of the wireless networks 506A-N using addressed and/or broadcast communications. In addition, a proprietary and/or open standard backhaul network may connect the network information outlets 508A-N to the location proxy servers 505A-N, by way of the network gateways 507A-N.

In the present embodiment, the location proxy servers 505A-N may abstract the knowledge of the specific wireless infrastructure, such that messages may be sent by the data/content providers 501 to locations (e.g. instead of specific network addresses), such that knowledge by the data/content providers 501 of the proprietary mobile networks 506A-N or the locations of the network information outlets 508A-N may optionally not be necessary. For example, the data/content providers 501 may send content to a location, the location proxy servers 505A-N may identify the addresses of network information outlets 508A-N relevant to the location (e.g. by querying the location database(s) 509 for network information outlets 508A-N having a location attribute, etc. matching the location), and may forward the content to those identified addresses of the relevant network information outlets 508A-N, which may then forward the content to the mobile devices 504 connected thereto.

By using the above system 500, physical configuration of the mobile networks 506A-N can change without changing addressing to network information outlets 508A-N and mobile devices 504. In addition, the data/content providers 501 do not necessarily have not to know about any changes in the mobile networks 506A-N. Furthermore, the data/content providers 501 and data/content aggregators 502 may optionally only need to know how to reach the location proxy servers 505A-N. The data/content aggregators 502 may, in one embodiment and from their perspective, acquire information from a physical location without knowing the infrastructure of the mobile networks 506A-N.

Moreover, messages can be directed by the data/content providers 501 to a location over multiple networks simultaneously, for example, where the location is business name capable of having a place of business at multiple different geographical points. In such example, multiple of the network information outlets 508A-N, located at different physical locations, may have a location attribute matching the location to which the message is directed.

To this end, location and optionally service attributes may be used as the basis for message routing, using the system described above. In particular, the system 500 may resolve internal routing information based on location (e.g. coordinates, physical location, logical location, functional or commercial description, etc.) attributes of a network I/O unit, or mobile device(s) in local proximity of a network I/O unit 508A-N, such that the sender 501 may send data to the mobile device 504 in proximity of the network I/O unit 508A-N based only on the location attributes of the network I/O unit 508A-N and the service attributes (e.g. type, preferences, authentication, etc.) of the mobile device 504. In this way, the system 500 may resolve internal routing information based on the location of the network I/O unit 508A-N, such that the a user may receive data from mobile device(s) in proximity of the network I/O unit 508A-N based only on the location attributes of the Network I/O unit 508A-N, and the service attributes of the mobile device 504.

Figure 6A:
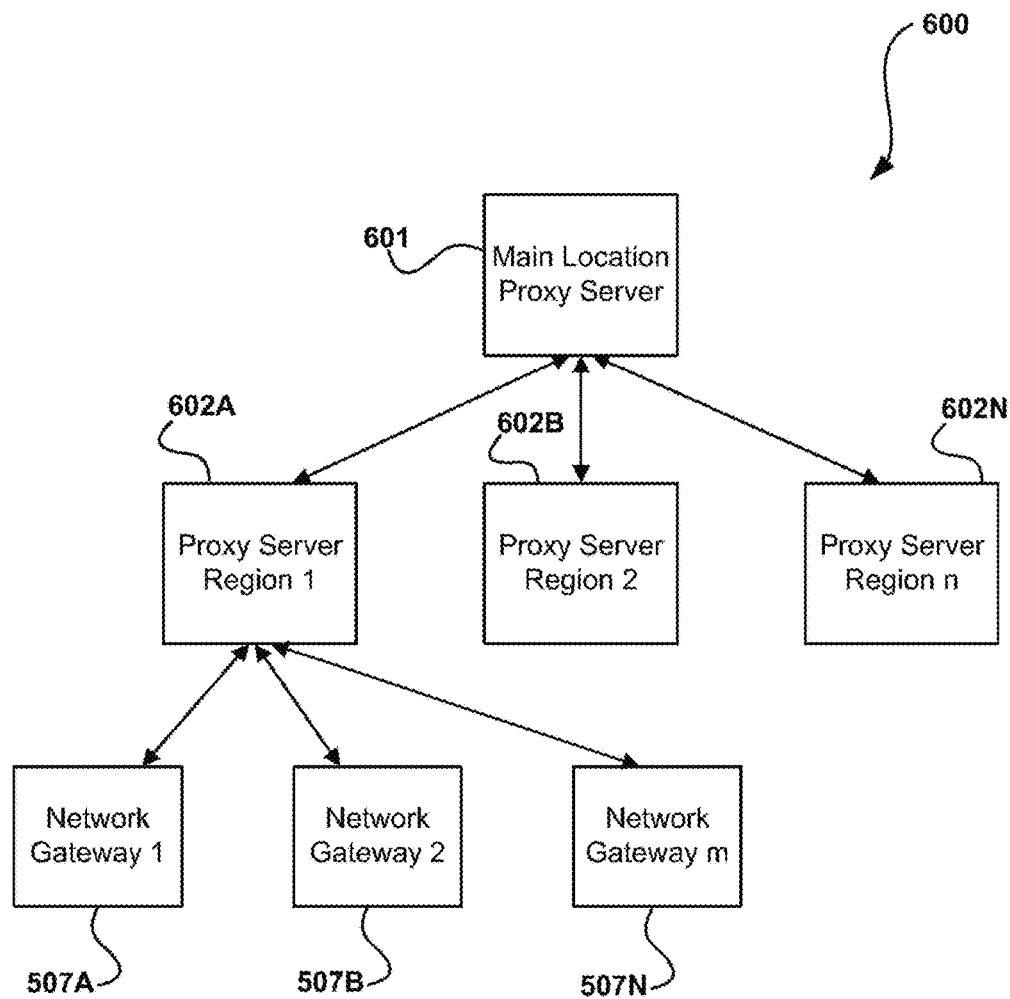
FIG. 6A illustrates a system for hierarchical information distribution and collection by region, in accordance with still yet another embodiment.

FIG. 6A illustrates a system 600 for hierarchical information distribution and collection by region, in accordance with still yet another embodiment. As an option, the system 600 may be implemented in the context of the architecture and environment of the previous Figures and/or any subsequent Figure(s). For example, the system 600 may be implemented with respect to the network components of FIG. 5. Of course, however, the system 600 may be implemented in any desired environment. Again, the aforementioned definitions may equally apply to the description below.

As shown, a main location proxy server 601 distributes information to different regions, each represented by a regional proxy server 602A-N. Each regional proxy server 602A-N distributes information to the appropriate network gateways 507A-N. In the same way, the regional proxy servers 602A-N forward information collected from the mobile devices 504 to the data/content aggregators 502 which are subscribers of the collected information, via the main location proxy server 601.

Figure 6B:
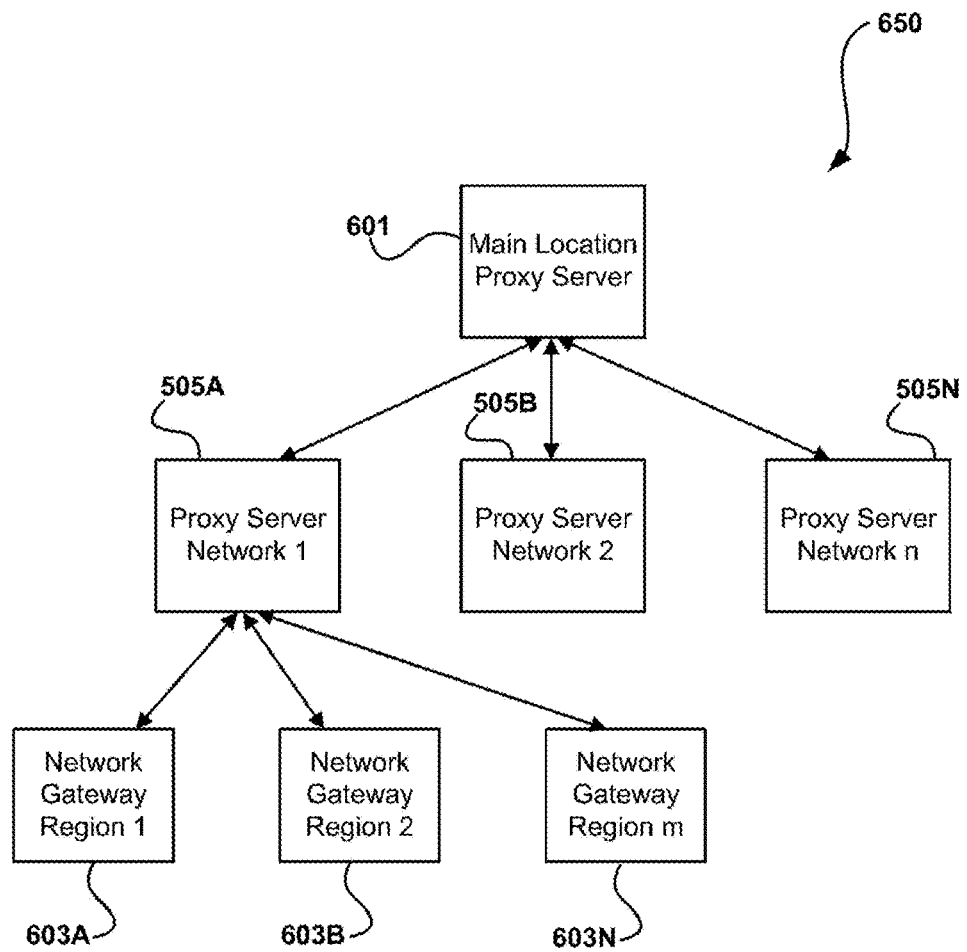
FIG. 6B illustrates a system for hierarchical information distribution and collection by network technology, in accordance with yet another embodiment.

FIG. 6B illustrates a system 650 for hierarchical information distribution and collection by network technology, in accordance with yet another embodiment. As an option, the system 650 may be implemented in the context of the architecture and environment of the previous Figures and/or any subsequent Figure(s). Of course, however, the system 650 may be implemented in any desired environment. Yet again, the aforementioned definitions may equally apply to the description below.

As shown, the main location proxy server 601 distributes information to the various network specific location proxy servers 505A-N, as described above with respect to FIG. 5. However, as not shown in FIG. 5, the information is then distributed to different regions, each represented by a regional network gateway 603A-N. In the same way, the regional network gateways 603A-N forward information collected from the mobile devices 504 to the network specific location proxy servers 505A-N, and onto the data/content aggregators 502 which are subscribers of the collected information, via the main location proxy server 601.

Figure 7:
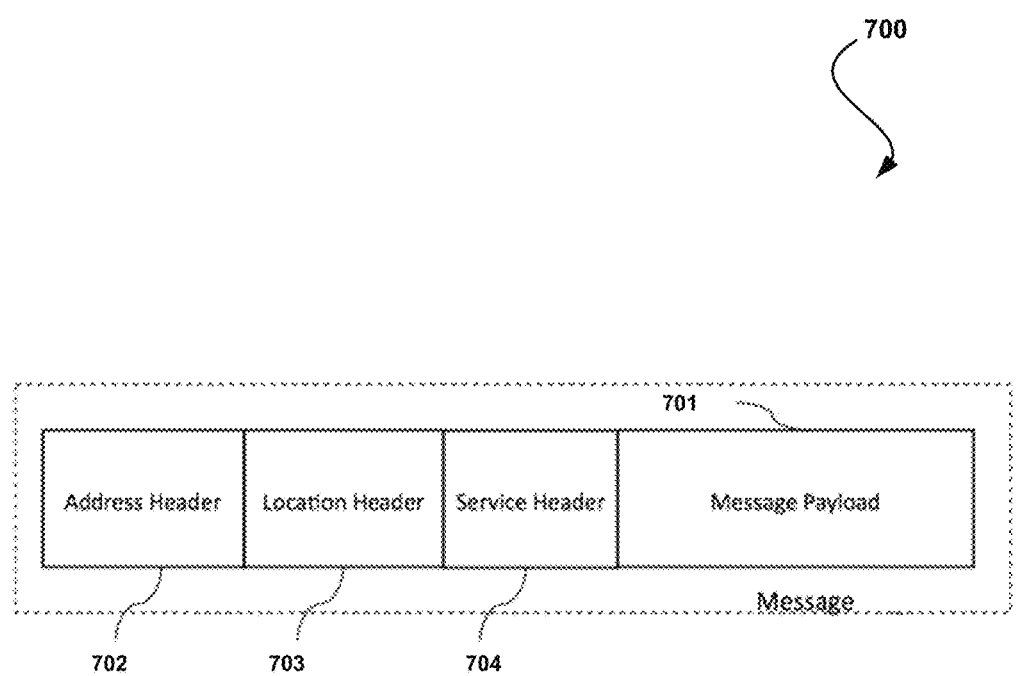
FIG. 7 illustrates a message structure, in accordance with another embodiment.

FIG. 7 illustrates a message structure 700, in accordance with another embodiment. As an option, the message structure 700 may be implemented in the context of the architecture and environment of the previous Figures and/or any subsequent Figure(s). Of course, however, the message structure 700 may be implemented in any desired environment. Yet again, the aforementioned definitions may equally apply to the description below.

The message structure 700 shown may include the structure of a message sent by a data/content provider (e.g. item 501 of FIG. 5) for delivery to a mobile device (e.g. item 504 of FIG. 5). The message structure 700 includes a message payload 1400 having content to be provisioned from the data/content provider. Such content payload 1400 may be text, media, etc.

The message structure 700 further includes an address header 701 which is a location proxy address header that designates the location proxy server (e.g. item 505A-N) to which the message is to be sent. The message structure 700 also includes a location header 703 which addresses the payload message 701 to a specific location. Moreover, the message structure 700 includes a service header 704 which may describe a type of service to be used for transmitting the message, along with optional attributes relevant for service delivery. It should be noted that the location header and service header may be implemented such that they can be extended to provide a wide variety of different ways to encode or reference different types of location or service related information.

As an option, the payload 1400 may be encrypted, while the headers described above may be readable by proxies. In this way, messages can be routed to a destination without impacting the integrity of the end to end transaction. As a further option, the location header 703 (and/or the service header 704) may be encrypted to protect from unauthorized sending of certain information to certain locations.

Figure 8:
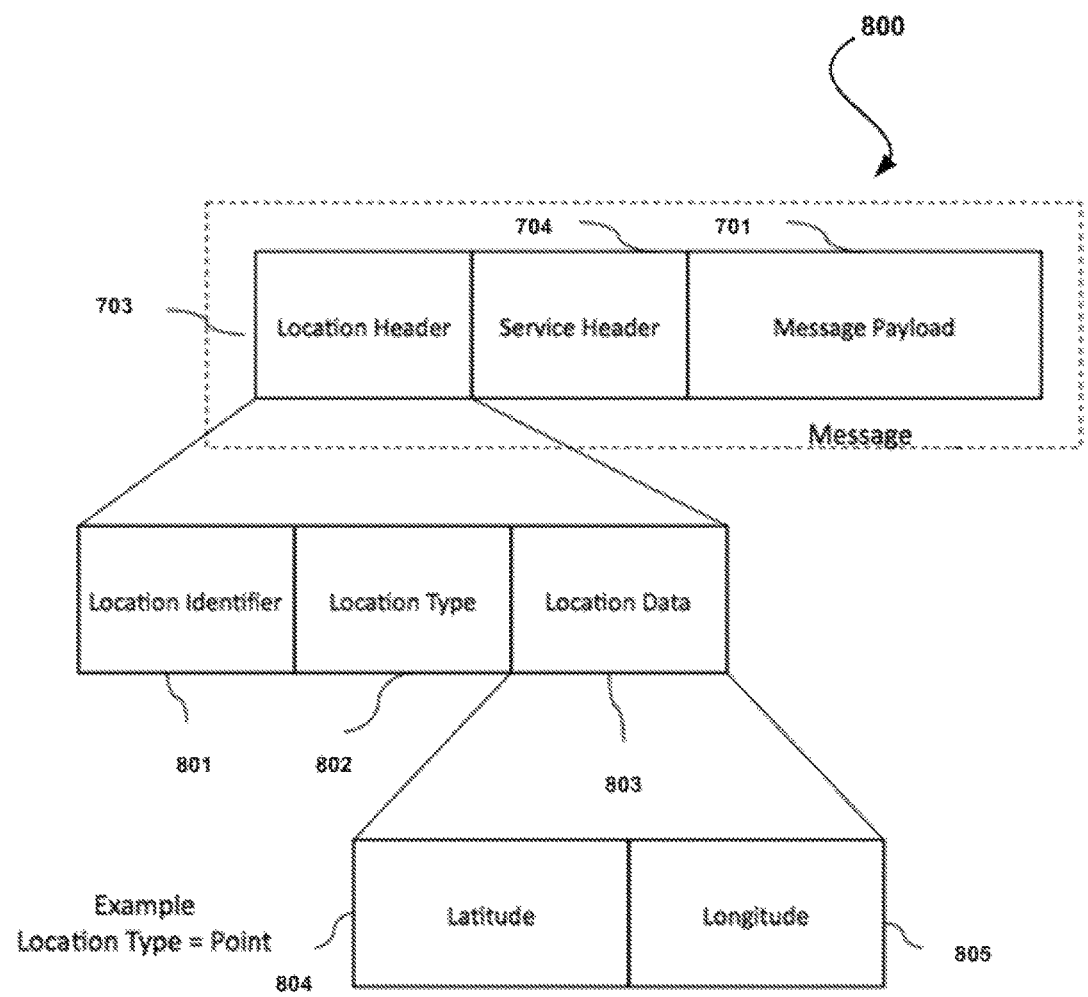
FIG. 8 illustrates location header formats, in accordance with yet another embodiment.

FIG. 8 illustrates location header formats 800, in accordance with yet another embodiment. As an option, the location header formats 800 may be implemented in the context of the architecture and environment of the previous Figures and/or any subsequent Figure(s). Of course, however, the location header formats 800 may be implemented in any desired environment. Still yet again, the aforementioned definitions may equally apply to the description below.

In the present embodiment, the location header 703 includes a location identifier 801 (e.g. road link ID, feature ID, attribute ID) which may optionally be used for cross-referencing a particular location. The location header 703 also includes a location type 802 (e.g. point, area, road link) indicating a type of the particular location (i.e. the location data format). Further, the location header 703 includes location data 803, which may include a latitude value 804 and longitude value 805, or other geographical coordinates. As a further option (not shown), the location header 703 may also include a timestamp.

It should be noted that the location headers may identify any desired locations, such as street addresses; street or road intersections; parking structures or lots; shopping centers, zones, or specific retail stores or outlets, including special sales at such locations; sports venues and or events; theme parks or theme park rides, concerts, or other theatrical or entertainment events, shows and expose such as auto shows, fairs, garden shows, home shows, pet shows etc.; and restaurants, including types of cuisine, food courts, etc.

By using the location header 703, a sender or receiver of data may specify a location according to a variety of attributes that may correspond to that location such as place names, coordinates, road intersections, business names, landmarks and other such parameters or attributes. These other attributes may also include logical attributes associated with information collected from the location such that the location attributes of a particular physical location may change depending the attributes of devices present at the location. The corresponding locations may not necessarily be unique, but may correspond to a plurality of locations corresponding to the attributes defined by the sender or receiver, for example specifying the name of a retail outlet might cause data to be sent to the locations of all such retail outlets, or collected from the locations of all such retail outlets.

Figure 9:
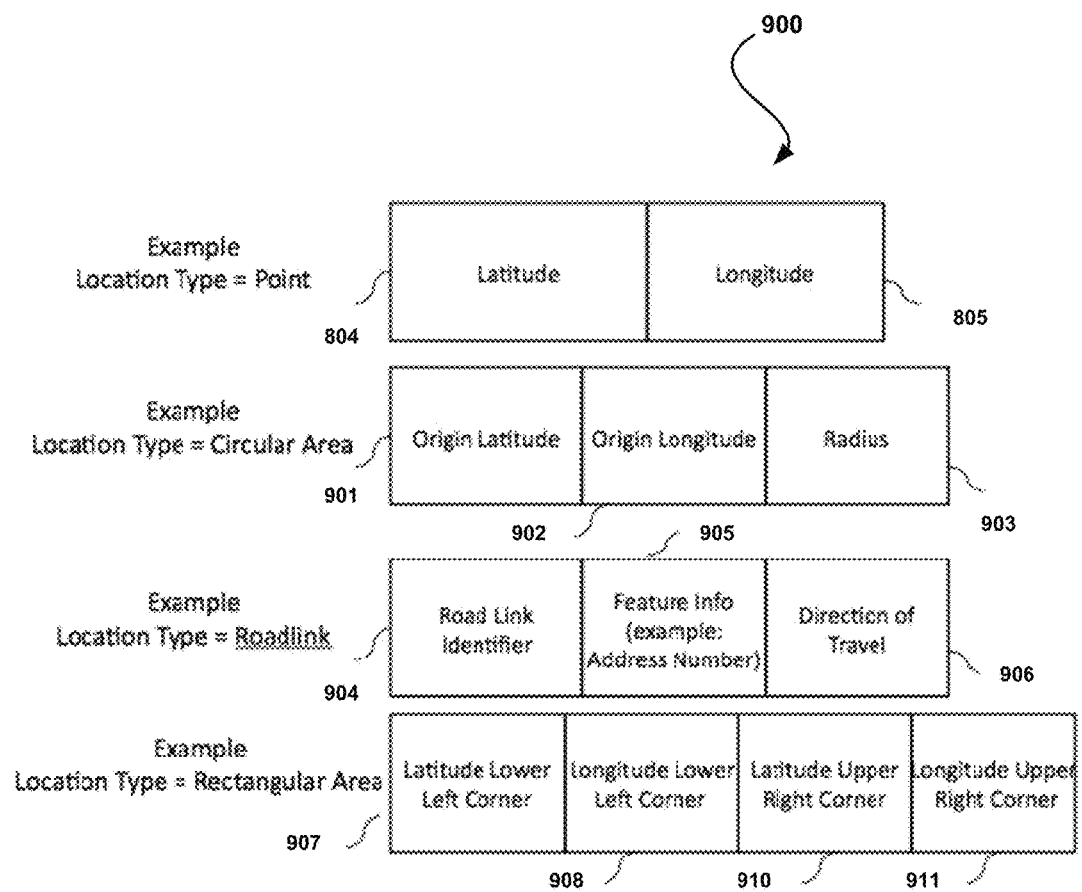
FIG. 9 illustrates location encoding formats, in accordance with yet another embodiment.

FIG. 9 illustrates location encoding formats 900, in accordance with yet another embodiment. As an option, the location encoding formats 900 may be implemented in the context of the architecture and environment of the previous Figures and/or any subsequent Figure(s). Of course, however, the location encoding formats 900 may be implemented in any desired environment. Further, the aforementioned definitions may equally apply to the description below.

As shown, each location type indicated by a location type message header may have a different data formats. For example, a point may be encoded by referring to a latitude value 804 and longitude value 805, or in other embodiments may refer to a landmark, a street address, an intersection of two roads, a mile-post and offset, etc.

A circular area may be encoded by referring to an origin latitude 901, an origin longitude 902, and a radius 903. A roadlink may be encoded by referring to a road link identifier 904, feature attributes 905 (e.g. an address number), a direction of travel 906. A rectangular area may be encoded by referring to a latitude lower left corner value 907, a longitude lower left corner value 908, a latitude upper left corner value 909, a longitude upper left corner value 910.

Of course, in other embodiments, an area may be encoded by ZIP code, political borders such as county, state, or country, and by referring to road segments. It should be noted, of course, that the above formats are shown by way of example only, and that there are many other data formats that can be used to encode various location types. Just by way of example, the Geographic Data Format (GDF 3.0), a CEN and ISO standard for encoding location data is incorporated herein by reference. Other optional standards include the ISO 3166 specification, the OpenGIS KML 2.2 Encoding Standard (OGC KML), CityGML, POI XML, RDF™, SIF+, and IETF RFC1712 (http://www.faqs.org/rfcs/rfc1712.html). In addition, private vendor encoding standards, such as Navteq NN4D and NAVSTREETS® data format, may be used.

As a further option, locations may be encoded abstractly using business type references such as North American Industry Classification System (NAICS) codes, stock exchange symbols, or other identifying references. Such references may also be combined with other location references such as city, state or county to reference businesses of a particular type or brand within a given geographic or jurisdictional region.

In other embodiments, any of the techniques disclosed herein may be used in combination (with possibly others as well), in order to validate, refine and/or otherwise further identify a location.

Figure 10:
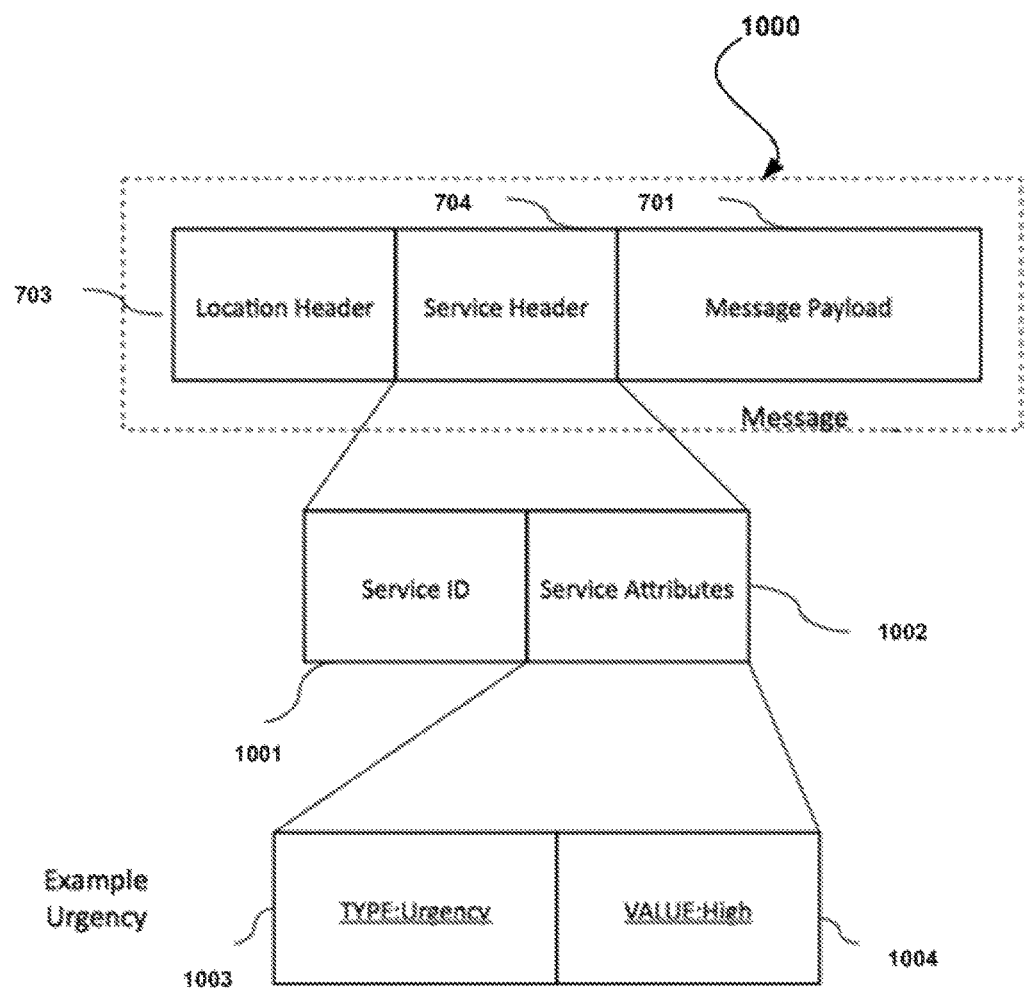
FIG. 10 illustrates a service header, in accordance with yet another embodiment.

FIG. 10 illustrates a service header 1000, in accordance with yet another embodiment. As an option, the service header 1000 may be implemented in the context of the architecture and environment of the previous Figures and/or any subsequent Figure(s). Of course, however, the service header 1000 may be implemented in any desired environment. Moreover, the aforementioned definitions may equally apply to the description below.

In the present embodiment, the service header 704 includes a service identifier 1001 and one or more service attributes 1002 associated with that service identifier 1001. The service attributes 1002 consist of an attribute type 1003 and an associated attribute value 1004. In the example shown, the urgency of the message may indicated by an urgency attribute 1003, which may be encoded with a value 1004 of "HIGH."

Figure 11:
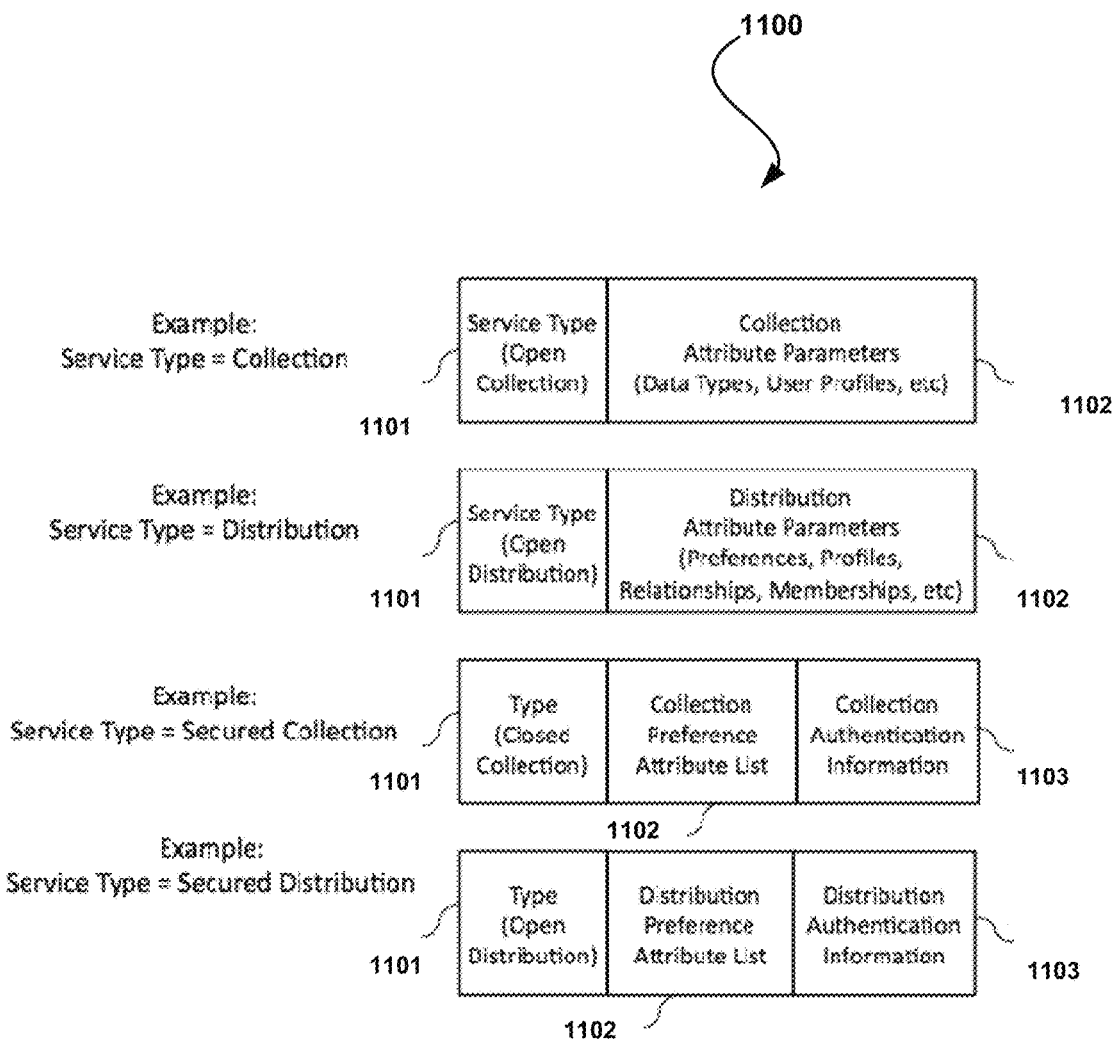
FIG. 11 illustrates service encoding formats, in accordance with still yet another embodiment.

FIG. 11 illustrates service encoding formats 1100, in accordance with still yet another embodiment. As an option, the service encoding formats 1100 may be implemented in the context of the architecture and environment of the previous Figures and/or any subsequent Figure(s). Of course, however, the service encoding formats 1100 may be implemented in any desired environment. Further, the aforementioned definitions may equally apply to the description below.

As shown, the service encoding formats 1100 include various service attributes may be included in a service header 704. For example, the service attributes 1002 may include any information that is relevant for handling of the associated message payload by a receiving device (e.g. mobile device). In one embodiment, the service header information may include preference information established by the user of the receiving device so that messages may be filtered according to the user's preferences (e.g. needs, interests, etc.).

Just by way of example, such service header information may include user preferences as service attributes for the transmission or reception of location addressed data. As another example, the service header information may be acquired from other devices or sources associated with the user, such as personal devices, or personally associated web sites such as MySpace, FaceBook, LinkedIn, etc., or may be set by the user either through a device user interface, or remotely through another interface that can communicate with the mobile device of the user.

In the examples shown, the service attributes 1002 a service type attribute 1101, and attribute parameters 1102 for that service type attribute 1101. For service attributes 1002 having a secured service type attribute 1101, such service attributes 1002 may also include authentication information 1103. In the first example, where the service type attribute 1101 is "Collection," indicating that the message is for data collection purposes (i.e. by a data/content aggregator), the attribute parameters 1102 include data types, user profiles, etc. to be used in determining a relevancy of the associated message to the receiving device.

In the second example, the service type attribute 1101 is "Distribution," indicating that the message is for data distribution purposes (i.e. to a mobile device), and the attribute parameters 1102 include preferences, profiles, relationships, memberships, etc. associated with the user of the receiving device to be used in determining a relevancy of the associated message to the receiving device.

In the third example, the service type attribute 1101 is "Secured Collection," indicating that the message is for secure data collection purposes (i.e. by an authenticated data/content aggregator). The attribute parameters 1102 include a preference attribute list to be used in determining a relevancy of the associated message to the receiving device, and the authentication information 1103 is further included for authenticating the receiving device.

In the fourth example, the service type attribute 1101 is "Secured Distribution," indicating that the message is for secure data distribution purposes (i.e. to an authenticated mobile device). The attribute parameters 1102 include a preference attribute list to be used in determining a relevancy of the associated message to the receiving device, and the authentication information 1103 is further included for authenticating the receiving device.

Thus, the information included in the service attributes 1002 may include various authorizations so that, for example, only users with approved credentials may receive certain broadcast messages. These authorizations may be implemented in multiple ways.

For example, a general broadcast to a local area regarding a person in that area in need of medical attention may be encrypted using the service attributes 1002 format described above, such that only mobile device users with appropriate training can decrypt the message and thereby be notified of the need should they choose to provide assistance. Such authorization may involve use of a digital key provided to the user based on a certification, or the mobile device may be instructed to contact a clearing center to provide specific information prior to be sent a decryption key. In this way, access rights may be assigned, provided and validated to assure that a sender has authorization to send data of a specified type to or from a specified location, and/or that a receiver has authorization to receive data of a specified type at or from a specified location.

In other (e.g. less critical) situations, the service attributes 1002 may include, for example, membership information so that messages relevant to specific membership levels can be targeted only at members of that level. This may allow information or instruction messages to be issued, for example, at an airport directing elite mileage club members to one place, while directing other level members to another. The same service attributes 1002 format may be used, for example in a shopping mall, where messages are filtered on reception by comparing the service attributes 1002 to the user profile data in the mobile device. Accordingly, messages targeted at teens may be received by mobile devices belonging to teens, while elderly shoppers might receive messages targeted to their specific needs or interests.

In still other embodiments, the service attributes 1002 may also include any attribute, characteristic, I/O value, etc. associated with a targeted device. Just by way of example, the service attributes 1002 may indicate a particular hardware and/or software aspect (e.g. characteristic, threshold, minimum value, etc.) to indicate which type of devices are the intended recipient of a message. For instance, such hardware and/or software aspect may include a minimum memory and/or processing capacity, a minimum operation system version, a list of one or more software applications that are required to be installed [e.g. browser, communication (e.g. email, instant message, etc.) platform, etc.], a list of one or more I/O capabilities (e.g. a minimum screen size, an existence of a particular I/O mechanism such as a camera, accelerometer, GPS, touch screen, etc.).

In other embodiments, the hardware and/or software aspect may be those that fluctuate over time. For instance, the hardware and/or software aspect may include remaining battery power or life, type and/or number (0, 1, 2, etc.) of open applications or applications currently-in-use, state of device (e.g. power-save mode, awake, phone call active, navigation system currently in use, data plan criteria (e.g. under/over budget, etc.), etc. As further examples, the service attributes 1002 may also include a direction of travel (e.g. moving toward and/or away a predetermined location, etc.), a type and/or speed of travel (e.g. moving or not, moving at a predetermined speed, any movement profile that indicates driving and/or walking activity, etc.). To this end, one may be able to ensure that the hardware and/or software is sufficient and/or more suited for a delivery and/or receipt of a particular message payload.

In still additional embodiments, the service attributes 1002 may involve application-related aspects (e.g. states, criteria, usage, parameters, etc.). For example, the service attributes 1002 may indicate a threshold, prevalence, type, etc. of use of a particular application (e.g. user of device has taken more than 100 pictures with a camera application, user of device regularly uses communication platform application, user of device has used a network browser at least once in past (thus indicating that he/she knows how), user currently has the network browser open, etc. In another example, specific application information may be specified. For example, the service attributes 1002 may specify that a calendar application indicate that the user of the device is "free" (i.e. has no scheduled activity, etc.) at a current time and/or at a prescribed time/timeframe, etc. As an option, any of the aforementioned information may or may not be accessible via an application-specific and/or standard application program interface.

In other embodiments, the aforementioned service attribute parameters may include other device-independent and/or user-independent and/or location-independent parameters. For example, such attribute parameters may include weather parameters (e.g. requirement of no rain or snow, minimum or maximum temperature, etc.), time parameters [e.g. business hours for a particular region, time of day and/or year, requirement of daylight (which may vary based on time of year), school hours (which may vary based on time of year), stock market activity, etc.

In even other embodiments, the service attributes may include criteria that involves a plurality of devices and/or users. For example, the service attributes may specify a threshold number of devices and/or users, a threshold number of devices and/or users in proximity to a predetermined location, a type of relationship between devices and/or users, etc. Such relationship may be a "friend" relationship, for example, as defined by a social networking site. For instance, the service attributes may indicate a threshold number of social network site members who have "checked-in" together.

Optionally, other user profile information may be included with any service attributes. For example, the service attributes may, in one embodiment, include purchase history, credit rating, Internet browsing activity (e.g. tracked by cookies or a social networking site, etc.). Further, other profile information may include gender, age, education, etc.

In still other embodiments, the service attributes may indicate criteria that is relevant to a receipt/display of, interaction with, etc. a particular message(s) and/or previous message(s). Just by way of example, the service attributes may indicate that a new message is to be distributed to only those locations/devices/persons that were in receipt of a previous message.

In some embodiments, any of the foregoing location/service attributes and/or parameters may be used as device software/hardware/users profiles for allowing a sender of messages to define a target audience/device. In other embodiments in addition or lieu of the foregoing, any of the above described attributes and/or parameters may be used as preferences for allowing a receiver of messages to control content receipt and/or display. It should also be noted that, in various optional embodiments, any of the foregoing attributes and/or parameters may be used by any one or more of a plurality of network components (e.g. any of the network components of FIG. 5, for example) and/or users/administrators thereof, for the purpose of controlling such distribution of messages, receipt of messages, and/or display of messages. Of course, it is also contemplated that any combination of any of the foregoing attributes and/or parameters may be utilized in such manner.

Figure 12:
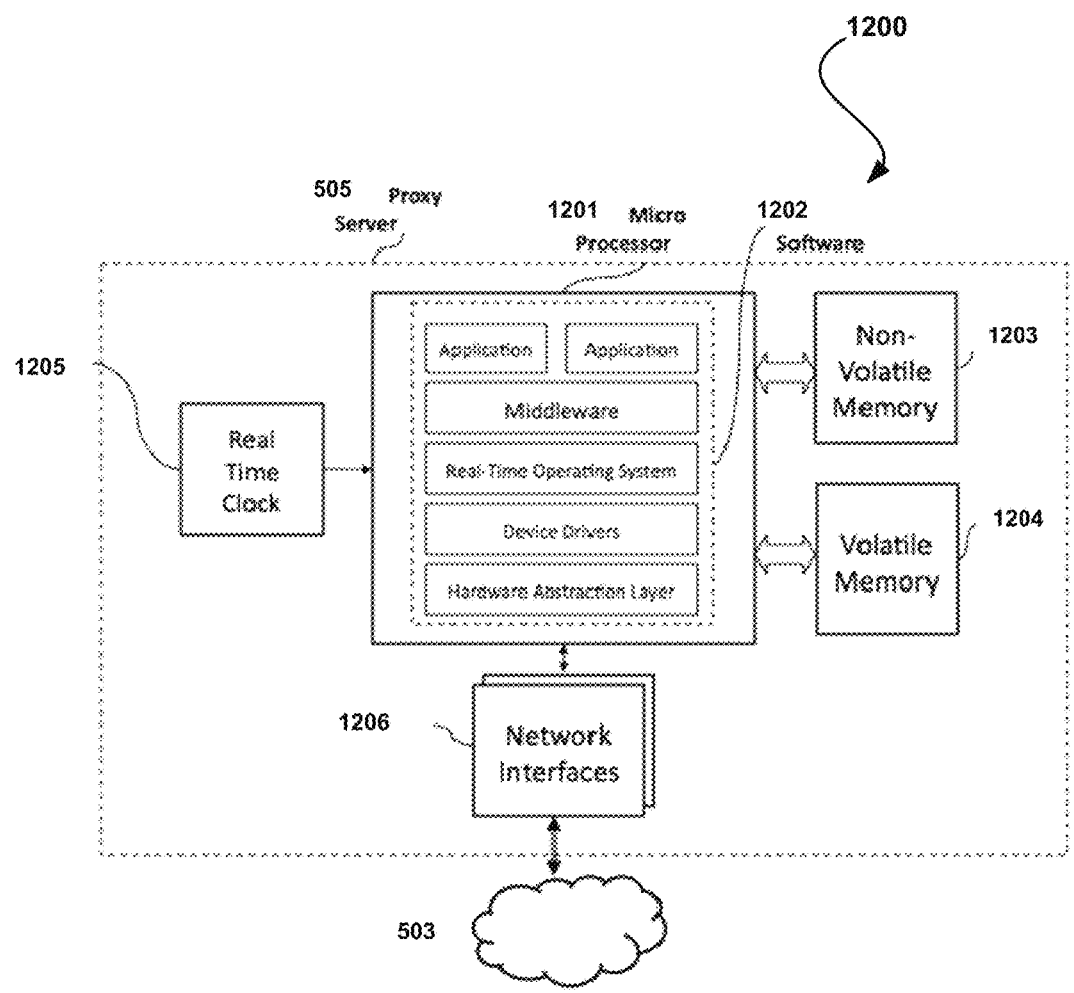
FIG. 12 illustrates hardware of a location proxy server apparatus, in accordance with another embodiment.

FIG. 12 illustrates a system 1200 including a location proxy server, in accordance with another embodiment. As an option, the system 1200 may be implemented in the context of the architecture and environment of the previous Figures and/or any subsequent Figure(s). Of course, however, the system 1200 may be implemented in any desired environment. Further, the aforementioned definitions may equally apply to the description below.

The location proxy server 505 may use a microprocessor 1201 to execute software 1202. The microprocessor 1201 has access to non-volatile memory 1203 and volatile memory 1204 for storing the software 1202 and providing storage for program data and communication caching. The location proxy server 505 may be further connected to one or more communication networks 503 using one or more network interfaces 1206. The location proxy server 505 may further have a real-time clock 1205 to process messages based on attributes indicated by headers included in such messages, such as headers storing time stamps, urgency information, etc.

The software 1202 may provide efficient routing of messages from data/content providers to mobile devices and/or from mobile devices to data aggregators, for example, as described in more detail below.

Figure 13:
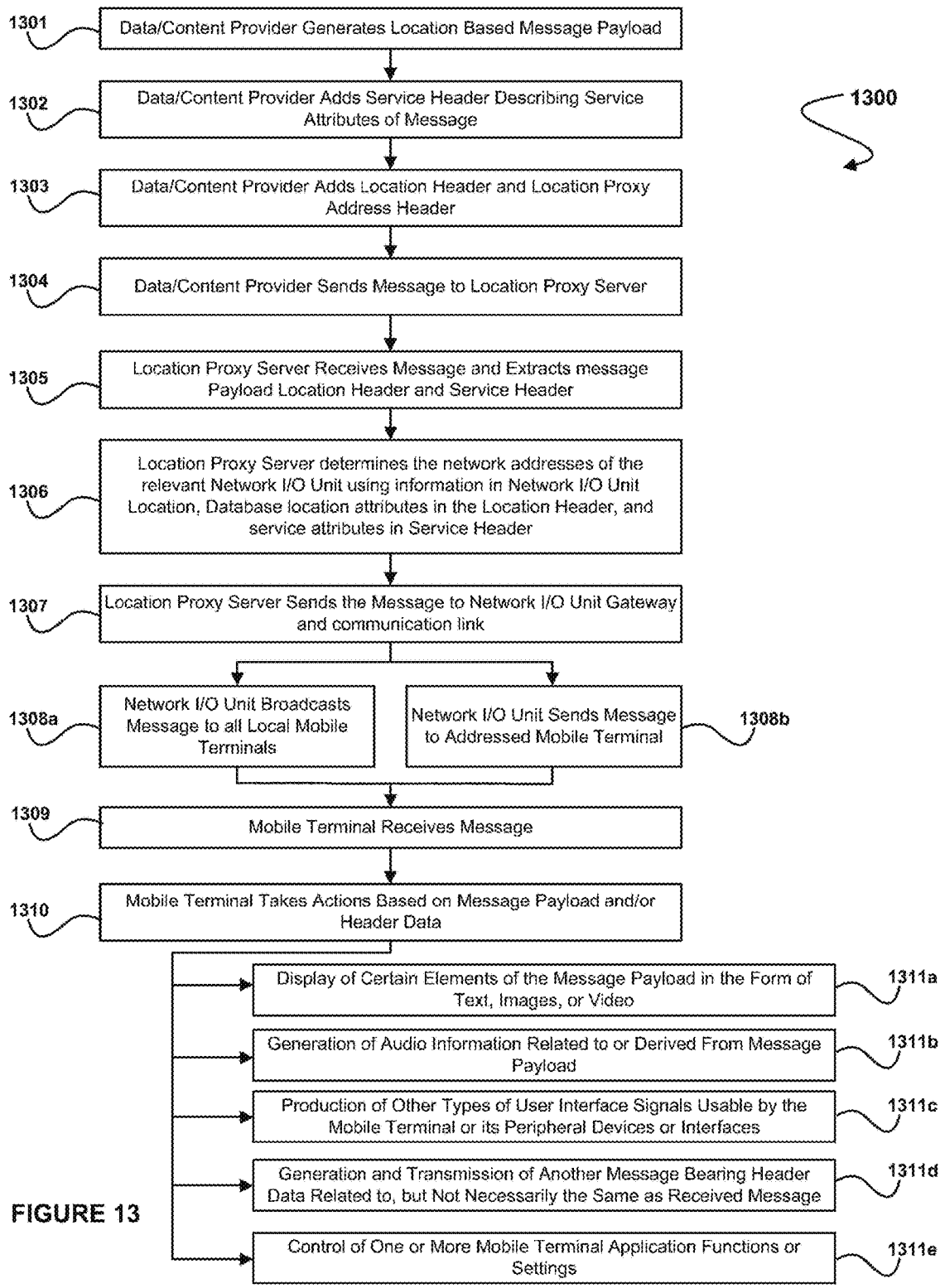
FIG. 13 illustrates a method for data distribution, in accordance with another embodiment.

FIG. 13 illustrates a method 1300 for data distribution, in accordance with another embodiment. As an option, the method 1300 may be carried out in the context of the architecture and environment of the previous Figures and/or any subsequent Figure(s). Of course, however, the method 1300 may be carried out in any desired environment. Again, the aforementioned definitions may equally apply to the description below.

As shown in operation 1301, a data/content provider creates a payload message to be distributed to mobile devices at a certain location. In order to provide the message to only valid (e.g. specific, relevant, etc.) devices, a service header is added to the message to describe the type of service and any attributes relevant for service delivery (operation 1302).

In operation 1303, the data/content provider adds a location header and location proxy address header to this message. The location header includes the location type (e.g. point, area, road link), encoded location data (e.g. latitude/longitude, x-y, or other geographical coordinates) and/or additional parameters (e.g. road link ID, feature ID, attribute ID) to address the payload message to a certain location.

As mentioned earlier, any location/service attributes and/or parameters may be used in connection with the foregoing operations. For example, see the non-limiting examples described in connection with FIGS. 7-11. To this end, the data/content provider may further refine a target audience/device for the message payload.

In operation 1304, the data/content provider sends the message to the appropriate location proxy server, which may be addressed by using a TCP/IP or UDP/IP address header, or any other networking address header for that matter. In operation 1305, the location proxy server receives the message via network from the data/content provider and extracts the location header along with the service header and payload message.

In operation 1306, the location proxy server examines the headers, and using information in a location database, determines the network addresses of the relevant network I/O units based on the location encoded information in the location header and service attributes in service header. The location proxy server uses the determined network addressing information to forward the message to the network I/O units determined to be relevant via a network gateway and associated communication link of the mobile networks associated with such network I/O units (operation 1307).

In operation 1308*a*, each of the network I/O units receiving the message broadcasts the message to all local mobile devices in its communication range. As an alternative to operation 1308*a*, each of the network I/O units may send the message individually to the current network addresses of mobile devices known to be in communications range of the network I/O unit.

As an option, in various embodiments, any of the aforementioned location/service attributes and/or parameters may be used in connection with any of operations 1305-1308*a/b* to direct the message to an appropriate target audience/device. Again, see, for example, the non-limiting examples described in connection with FIGS. 7-11.

Furthermore, in operation 1309, a mobile device to which the message is broadcasted/addressed receives the message from the network I/O unit by which the message was sent. The mobile device performs actions based on the message payload and/or headers included in the message (operation 1310). As shown in operations 1311*a*-1311*e*, such actions may include any of (and in any order): displaying of certain elements of the payload message, for example, in the form of text, images or video (operation 1311*a*); generating audio information related to or derived from the message content (operation 1311*b*); producing of other types of user interface signals usable by the mobile device or its peripheral devices or interfaces (operation 1311*c*); generating and transmitting another message having headers related to, but not necessarily the same as, the received message (operation 1311*d*); and controlling one or more device application functions based on the information in the message headers (operation 1311*e*).

Examples of such device application functions include requesting additional device specific information from the network I/O unit from which the message was received, such as security information; decrypting received content, holding the message until some other criteria is met (for example the location of the mobile device is within a geographic region specified in the message, or a specific time elapses, etc.), and then talking one or more of the actions described in operations 1311*a*-1311*d*, etc. Such actions may also include comparison of the message headers and or payload to stored user preferences to determine the appropriate actions, which may optionally include taking no action.

In some embodiments, any of the aforementioned location/service attributes and/or parameters (e.g. see non-limiting examples described in connection with FIGS. 7-11, etc.) may be used in connection with any of operations 1310-1311*a/b/c/d/e* to direct the message to an appropriate target audience/device and/or to allow a receiver (device and/or user) of messages to control content receipt and/or display. Specifically, any one or more of operations 1310-1311*a/b/c/d/e* may conditionally occur based on the aforementioned location/service attributes and/or parameters.

Of course, it is contemplated that the aforementioned use of location/service attributes and/or parameters may or may not be: exclusively on the part of the data/content provider (e.g. via target device/user profiling, etc.), exclusively on the part of the user (e.g. via preference setting, etc.), and/or any combination thereof. Just by way of example, in one embodiment, any one or more of operations 1301-1308*a* may be exclusively based on the location attributes and/or parameters, such that a large set (e.g. all, nearly all, etc.) of devices/users at a predetermined location are capable of receiving the message. Further, again in the context of the above example, the devices/users may be exclusively based on the service attributes and/or parameters, such that only a focused subset (e.g. a small fraction, etc.) of the large set of devices/users at the predetermined location act on the message via any one or more of operations 1310-1311*a/b/c/d/e*. Again, as mentioned earlier, other embodiments are contemplated whereby the service attributes and/or parameters may be utilized in connection with any one or more of operations 1301-1308*a*, the location attributes and/or parameters may be utilized in connection with any one or more of operations 1310-1311*a/b/c/d/e*, any mixture thereof, etc.

Thus, the data/content provider may send data to a particular physical location such that network devices in that location can receive such data only as a result of their physical presence at that location and the device preferences or authorizations (i.e. service attributes). The provider of such data may describe a location tolerance or range such that mobile devices within that range may receive such data, but mobile devices outside that range may not. Still yet, users receiving such data may not necessarily need to identify themselves to any elements of the mobile network, and they may not necessarily require any form of network identity or address in order to receive such data. Further, the users may further control any aspect (e.g. how, what, when, where, etc.) of such message communication, as desired, via preference setting or the like. Still yet, as an option, various types of authorization and validation may be provided allow a data/content provider to securely send information to mobile devices within the area corresponding to the specified location attributes that are also authorized to receive such data.

Figure 14:
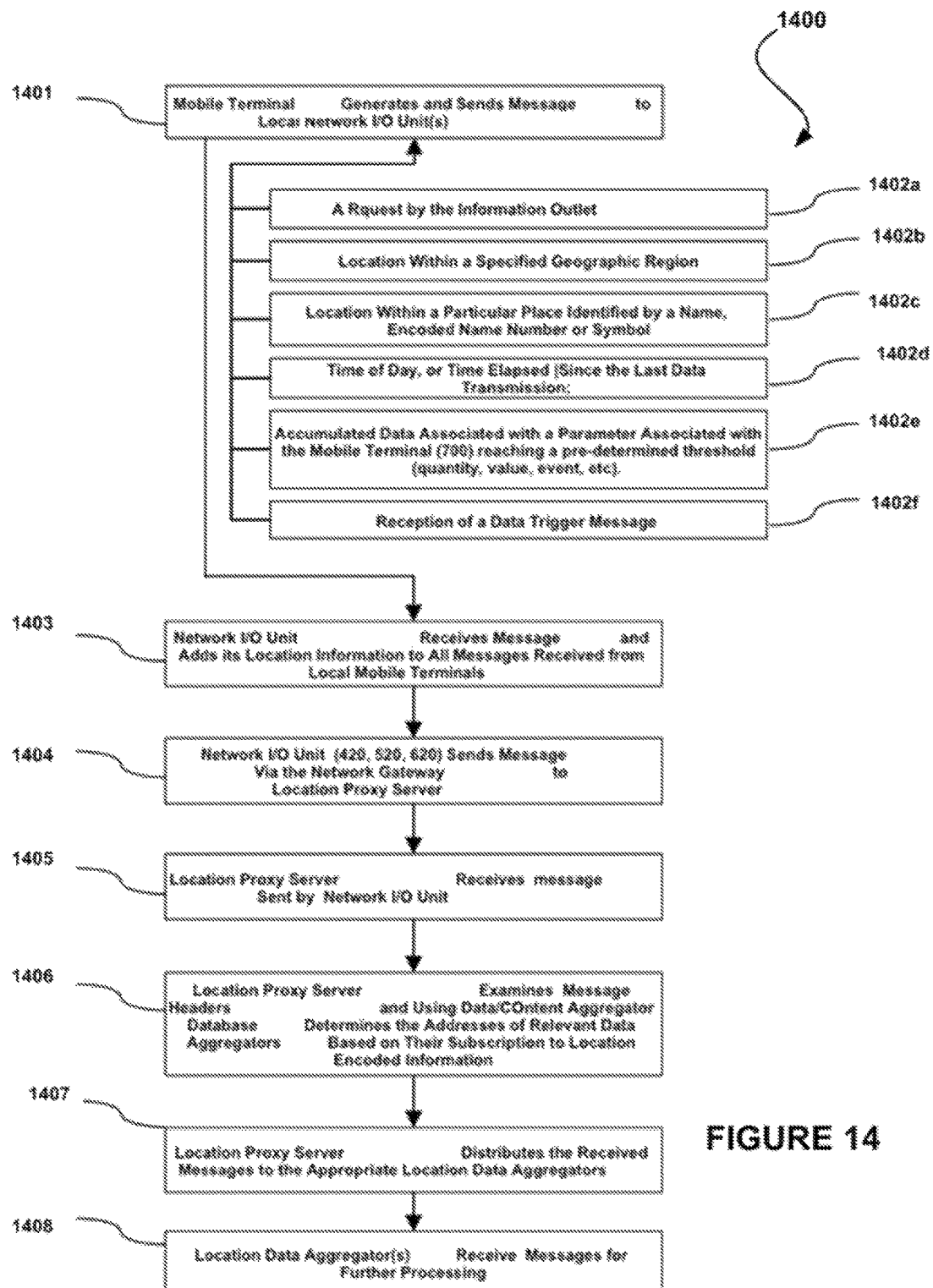
FIG. 14 illustrates a method for data collection, in accordance with another embodiment.

FIG. 14 illustrates a method 1400 for data collection, in accordance with another embodiment. As an option, the method 1400 may be carried out in the context of the architecture and environment of the previous Figures and/or any subsequent Figure(s). Of course, however, the method 1400 may be carried out in any desired environment. Again, the aforementioned definitions may equally apply to the description below.

As shown in operation 1401, a mobile device sends a message to local network I/O units (i.e. network I/O units with which the mobile device is on communication). In an alternative embodiment (not shown), the mobile device may also broadcast the information to other mobile devices in the same local network or available through ad-hoc networking. In yet another embodiment, the mobile device may use a positioning system such as GPS and or a digital map to determine its location and add the location type (e.g. point, area, road link), location data, (e.g. latitude/longitude, x-y, or other geographical coordinates) and as well as additional parameters (e.g. road link ID) to headers of such message.

As shown in operations 1402a-1402f, the mobile device may generate such message on the basis of a variety of events, such as: a request by the network I/O unit (operation 1402a); being located within a specified geographic region (operation 1402b); being located within a particular place identified by a name, encoded name number or symbol or other place attribute (operation 1402c); a time of day, or time elapsed since a last message transmission (operation 1402d); accumulated data associated with a parameter associated with the mobile device reaching a pre-determined threshold, such as luantity, value, event, etc. (operation 1402e, where the parameters associated with mobile device may include operating parameters for the mobile device or the user, or a vehicle in which the mobile device is either embedded, connected or being carried, etc.); and reception of a data trigger message from another mobile device or from a device located in proximity to, or integrated with the network I/O unit (operation 1402f).

As an option, in various embodiments, any of the location/service attributes and/or parameters disclosed herein (e.g. see non-limiting examples described in connection with FIGS. 7-11, etc.) may be used in connection with any one or more of operations 1401-1402a/b/c/d/e/f to conditionally trigger the same. In various embodiments, such location/service attributes and/or parameters may be used to trigger the sending of predetermined and/or requested information. Such triggering may be in response to a request message, preconfigured settings in association with the device, and/or any other mechanism.

Still yet, in addition or lieu of the aforementioned conditional triggering, any of the location/service attributes and/or parameters disclosed herein (e.g. see non-limiting examples described in connection with FIGS. 7-11, etc.) may be used to dictate a content of a message. Of course, in other embodiments, any other aspect of the message (e.g. header information, destination information, message trigger criteria, etc.) may be based on the location/service attributes and/or parameters.

In operation 1403, the network I/O unit receives the message from the mobile device and adds its location information to the message. In operation 1404, the network I/O unit sends the message via a network gateway included in the associated mobile network to a location proxy server. It should be noted that the network I/O unit may also aggregate a plurality of messages received either from a single mobile device or from multiple mobile devices, and send the aggregated messages as a single aggregate message to the location proxy server.

In operation 1405, the location proxy server receives the message sent by the network I/O unit, and in operation 1406 the location proxy server examines the headers of the message and using a data/content aggregator subscriber database, determines the addresses of relevant data aggregators based on such data aggregators subscription to location encoded information included in the message headers.

In operation 1407, the location proxy server distributes the received messages to the appropriate data aggregators (e.g. via a backhaul connection). It should be noted that depending on the contents of location subscriber database, the location proxy server may distribute all messages with the specified location and content information to a data/content aggregator or it may distribute portions of those messages. In operation 1408, the data/content aggregators receive the messages for further processing.

In a variety of embodiments, any of the location/service attributes and/or parameters disclosed herein (e.g. see non-limiting examples described in connection with FIGS. 7-11, etc.) may be used in connection with any one or more of operations 1403-1408 to govern whether (and, if so, a manner in which) messages are routed and/or to where. Of course, like every feature disclosed herein, such technique is optional.

To this end, data aggregator may receive data sent from any mobile devices located at a location specified by the data aggregator that are sending data. Such a data aggregator may specify a tolerance or range such that it will receive data sent by mobile devices within that location range or area, and optionally not from mobile devices not within the specified area. In addition, users sending such data may not necessarily identify themselves to any elements of the mobile network with which they are associated, and they may not require any form of network identity or address in order to send such data. Various types of authorization and validation may be provided to allow a data aggregator to securely receive information from mobile devices within the area corresponding to the specified location attributes that are also authorized to send such data.

Figure 15:
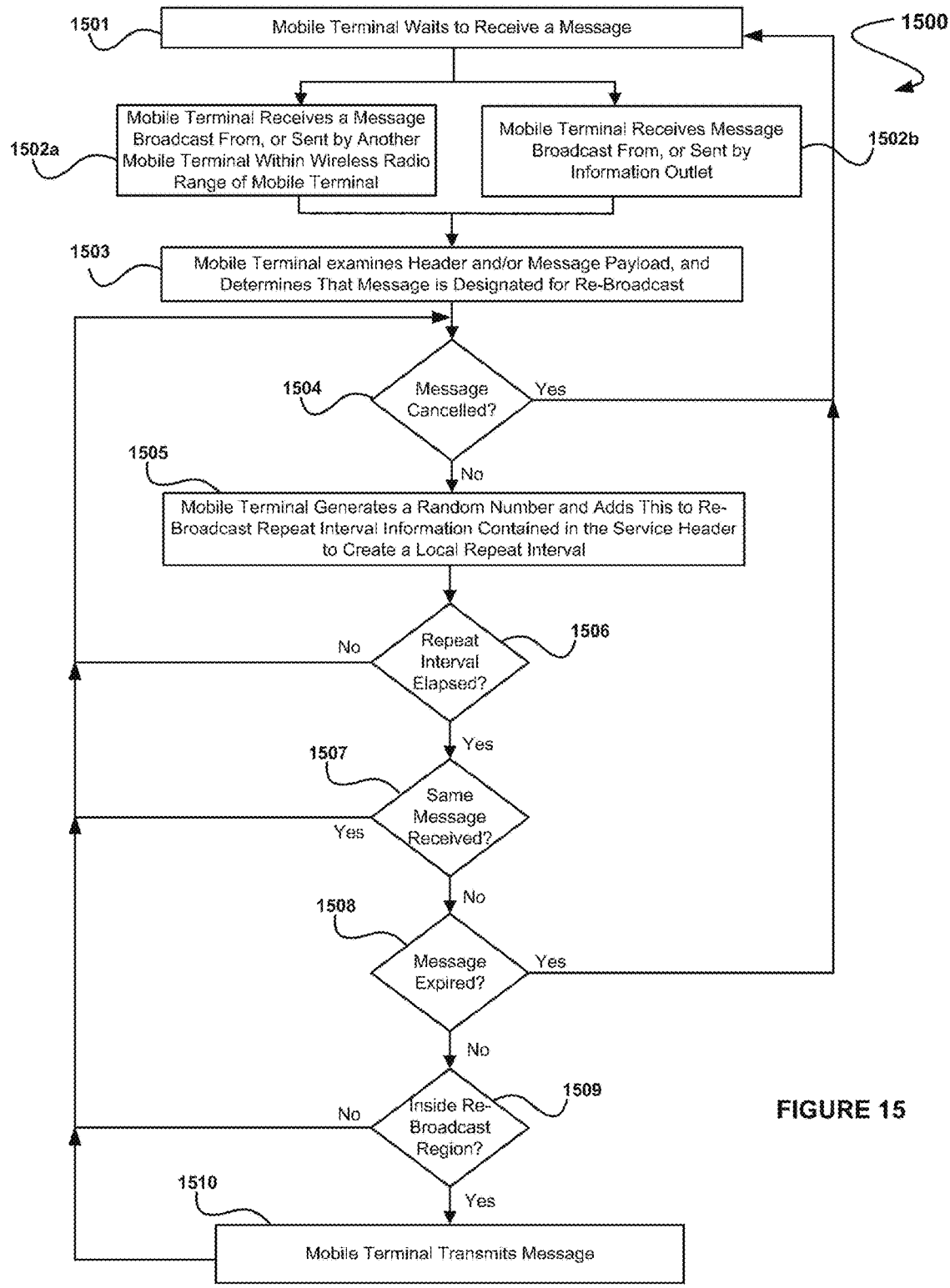
FIG. 15 illustrates a method for data re-broadcasting, in accordance with another embodiment.

FIG. 15 illustrates a method 1500 for data re-broadcasting, in accordance with another embodiment. As an option, the method 1500 may be carried out in the context of the architecture and environment of the previous Figures and/or any subsequent Figure(s). Of course, however, the method 1500 may be carried out in any desired environment. Yet again, the aforementioned definitions may equally apply to the description below.

Assuming a mobile device has received and acted on a message generated by a data/content provider, for example, as described in connection with FIG. 13 (e.g. received and displayed the message), the mobile device may further distribute such received message. Such distribution may optionally be independent of a network I/O unit, as described below with reference to the method 1500 of FIG. 15.

In operation 1501, a mobile device waits to receive a message. When the mobile device receives a message broadcast from, or sent by, a network I/O unit or other mobile device (e.g. within wireless radio range of the receiving mobile device), as shown in operations 1502a-1502b, the mobile device examines headers and/or a payload of the message and determines that the message is designated for re-broadcast (operation 1503).

As an option, in various embodiments, any of the location/service attributes and/or parameters disclosed herein (e.g. see non-limiting examples described in connection with FIGS. 7-11, etc.) may be used in connection with any one or more of operations 1501-1503 to conditionally trigger any re-broadcasting. Still yet, in addition or lieu of the aforementioned conditional triggering, any of the location/service attributes and/or parameters disclosed herein may be used to dictate a content of a re-broadcasted message. Of course, in other embodiments, any other aspect of the re-broadcast (e.g. see decisions below, etc.) may be based on the location/service attributes and/or parameters.

As shown in decision 1504, the mobile device compares the headers and/or payload to a list of cancelled re-broadcast messages received at some earlier time, such that if the message has been cancelled, the mobile device deletes the received message, and returns to operation 1501.

Otherwise, as shown in operation 1505, the mobile device generates a random number (e.g. between −200 and +200) and adds this (i.e. local repeat interval value) to re-broadcast repeat interval information contained in the service header of the message, for example, as measured in milliseconds. It should be noted that the value of the random number added to the re-broadcast repeat interval may depend on the type of network on which the mobile device is located, and that other values may be used to optimize performance based on the transmission and message processing time of the mobile network and the mobile device.

Furthermore, the mobile device compares the local repeat interval to the time elapsed since it last received the same message or transmitted the same message, and determines in decision 1506 whether the local repeat interval has elapsed. If the time elapsed since receiving or transmitting the message is less than the re-broadcast repeat interval, the mobile device returns to decision 1504 (e.g. it waits for the local repeat interval to expire).

If the time elapsed since receiving or transmitting the message is equal to or greater than the re-broadcast repeat interval, the mobile device compares message and/or payload to any messages received since the subject message was received, and it is determined in decision 1507 whether any received messages are the same as the subject message. If any of the received messages are the same as the subject message, the mobile device returns to operation 1504. Otherwise, if no received messages are the same as the subject message, then the mobile device compares the re-broadcast time expiry information contained in the Service Header to the current time and determines in decision 1508 whether the re-broadcast expiry time is after the current time.

If the re-broadcast expiry time is not after the current time, the message is deleted and operation returns to operation 1501. If the re-broadcast expiry time is after the current time, the mobile device compares the re-broadcast region information contained in the location to its current location and determines in decision 1509 whether the it is inside the re-broadcast region. It should be noted that the re-broadcast region may optionally be geographically separate from the reception region in the vicinity of the network I/O unit with which the mobile device is in communication.

If the mobile device is not inside the re-broadcast region, it returns to operation 1504. Otherwise, if the mobile device is inside the re-broadcast region, the mobile device broadcasts the message (operation 1510) and returns to operation 1504. To this end, the method 1500 may cause messages to be re-transmitted by mobile devices to other mobile devices within radio range at regularly specified intervals within the re-broadcast region. If the message has been re-broadcast by another mobile device, then all mobile devices receiving such broadcast will reset their re-broadcast timers and continue to wait. If the mobile devices receive a cancellation message, or if the message expires, then they will exit the method 1500 for that message. If the mobile device is not within the re-broadcast region, then it may hold the message until it is cancelled, or it expires, or until the mobile device re-enters the re-broadcast region.

If the message is not expired or cancelled, and the mobile device is inside the re-broadcast region, then when the local repeat interval expires it may re-transmit the message. In this way, the message may continue to be broadcast and spread geographically throughout the re-broadcast region as long as mobile devices are present. In one embodiment, if the broadcast region surrounding network I/O units is not the same as the re-broadcast region, this method 1500 may cause the effective broadcast region for the message to be the geographic union of both regions, or may cause the message to be broadcast in two distinct regions, one in the vicinity of the network I/O units, and one at another defined location where there is not necessarily a network I/O unit.

In one embodiment, the range of the network I/O units be such that a mobile device in any given location may be able to communicate with multiple network I/O units, and that such a situation may require additional processing to detect duplicate messages received from two or more network I/O units. Similarly, the broadcast of data from a mobile device in any given location may be received by multiple network I/O units, and that the location proxy server or the data aggregator may require additional processing to eliminate duplicate messages.

In another embodiment, the mobile device may identify the closest network I/O unit using, for example, the location of the network I/O unit as included in or appended to the message by the network I/O unit and compared to the location of the mobile device as determined using global positioning system (GPS), time difference of arrival (TDOA), angle of arrival (AOA), received signal strength measurements or other positioning schemes. Such positioning schemes may be independent of the network I/O units (e.g. self contained in the mobile device) or they may be cooperative, wherein the stationary network I/O units each measure signal strength of each other and/or the mobile devices, and provide information to the mobile devices to aid in determining the relative position of the mobile device to the network I/O units.

To this end, mobile devices receiving a message in the vicinity of any of the network I/O units, on the basis of their direction of travel and/or proximity to the specified destination location, may re-broadcast this data to other mobile devices at other locations. In this embodiment, a message communicated in this way may flood the region between the network I/O units and the location identified by the location parameters by being passed from mobile unit to mobile unit until the message is transmitted in the vicinity of the destination location. Thus, the re-broadcast of the message may be managed, as described above, to prevent unnecessary re-broadcasting in areas where there are multiple mobile devices, and may prevent the propagation of the message in directions away from the intended destination, and to limit the overall geographic spread of message re-broadcasting. Further, as noted above, the message may be deleted after a specified period of time has elapsed, or if the mobile device moves sufficiently far away from the specified location. Still yet, an "anti-message" may be sent such that, when received by a mobile device, will terminate the re-broadcast and/or validity of a previously received message subject to such re-broadcasting.

Figure 16:
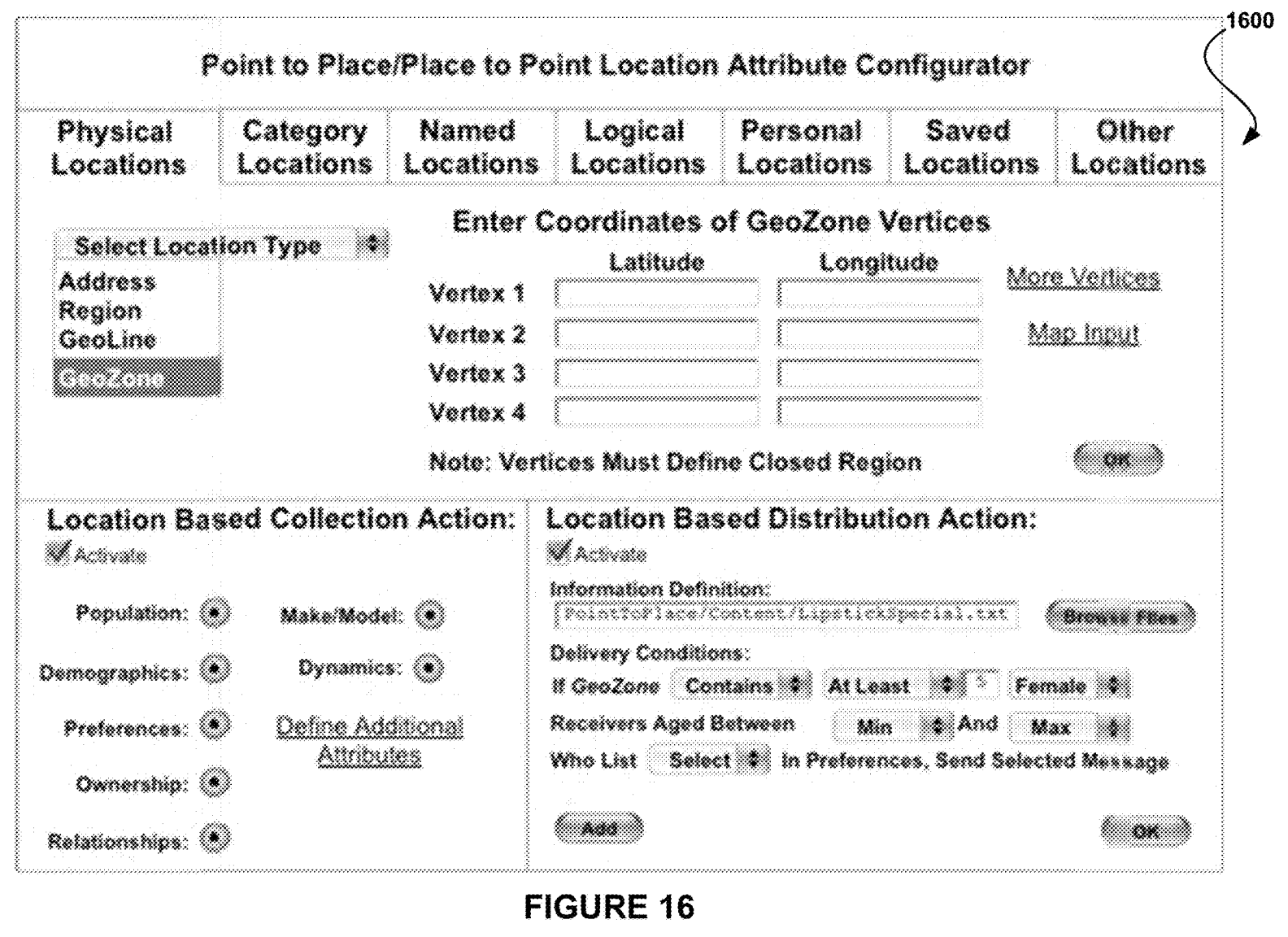

FIG. 16 illustrates an attribute interface 1600, in accordance with another embodiment. As an option, the attribute interface 1600 may be implemented in the context of the architecture and environment of the previous Figures and/or any subsequent Figure(s). Of course, however, the attribute interface 1600 may be carried out in any desired environment. Again, the aforementioned definitions may equally apply to the description below.

The attribute interface 1600 allows a user to configure location attributes (and/or any other attributes, for that matter). For example, a data/content provider may configure the location attributes for associating the same with a message (e.g. including the location attributes in a header of the message, etc.), such that a location to which the message is relevant may be specified. As another example, a data/content distributor may configure the location attributes for defining the locations of mobile devices from which information is to be gathered.

As shown, the location attributes may be defined as physical locations (e.g. address, coordinates, region, etc.), category locations (e.g. retail outlet, event, venue, etc.), named locations (e.g. brands/trademarks, historical, registered under a particular name, etc.), logical locations (e.g. conditional/combinatorial, etc.), personal locations (e.g. people, groups, personal places, etc.), saved locations (e.g. previous locations, etc.), etc.

In the non-limiting embodiment shown, the physical location attributes may be configured by location type in a number of ways. For example, a specific address (or group of addresses) may be provided to input the location after a selection of an address option (as shown) of the attribute interface 1600. In another embodiment, a region (e.g. continent, country, state, county, city, town, etc.) may be input after a selection of a region option (as shown) of the attribute interface 1600. In still another embodiment, a line or zone may be defined in response to a selection of a respective geoline or geozone option of the attribute interface 1600.

In an example where the location type option selected includes a zone or "geozone," an interface portion like that shown may be provided. For instance, as shown, a plurality of latitude/longitude pairs may be entered to define a plurality of vertices which, in turn encompass an area that is desired to be a locational target of one or more messages. As shown, options may be provided for allowing a user to add more vertices as needed, for providing a desired amount of granularity. As further shown, a map option may be provided for allowing a user to simply mark-up a map which, in turn, may allow code to automatically generate the vertices (or other location-defining information), to accomplish the same. Strictly as an option, such vertices may be required to define a closed region.

The attribute interface 1600 may also allow a user to activate and configure service attributes, such as profiles associated with mobile devices/associated users from which information is collected and/or profiles associated with the mobile devices associated users to which information is distributed. The profiles may include demographic information, preference information, any of those shown in the attribute interface 1600 (or others that are not shown). As further shown in the attribute interface 1600, any location-based collection action may be further refined by selecting an option to define additional attributes (e.g. via user configuration and/or selection of predetermined attributes including, but not limited to the non-limiting examples described in connection with FIGS. 7-11, etc.).

As an additional option, the attribute interface 1600 may provide for selection/configuration of location-based actions in any desired manner [e.g. in response to a selection of an activate option (as shown)]. For example, as illustrated, a field may be provided for allowing a user to select information [e.g. via a text entry of a pointer (as shown), a browse files menu option, etc.]. Such information may, for example, be constructed utilizing a separate interface or preconfigured, etc. in the form of messages ready for delivery in a manner dictated by the attribute interface 1600.

As further shown, delivery condition options may be provided in connection with the attribute interface 1600 to, for example, further refine a target audience by selection/configuration of any desired attributes (e.g. the non-limiting examples described in connection with FIGS. 7-11, etc.). For instance, as shown, an option may be provided to refine an intended audience to include a predetermined number of users of a predetermined gender with a certain selected age range who include certain selected preferences. Of course, other icons [e.g. an add icon (as shown), etc.] may be provided to augment the delivery options, as desired.

It should be noted that, in various embodiments, any of the location/service attributes and/or parameters disclosed herein (e.g. see non-limiting examples described in connection with FIGS. 7-11, etc.) may be used in connection with the attribute interface 1600 as selectable/configurable attributes in the context of any of the examples set forth hereinabove (or others). Further, it should be noted that the attribute interface 1600 (and any other interfaces disclosed herein) may be implemented in any desired manner including, but not limited to web-based interfaces, client application interfaces, etc.

In one embodiment, the attribute interface 1600 may be a component of an advertisement interface that allows content providers, advertisers, etc. to control the sending, display, etc. of messages that include advertisements. In such embodiment, an advertisement generation interface(s) (not shown) may be included for allowing such content providers, advertisers, etc. to generate advertisements for inclusion with the messages. Still yet, an advertisement analytics interface (also not shown) may be included for allowing the content providers, advertisers, etc. to run "what-if scenario" tests to determine a scope of devices/users would receive messages (including advertisements) given a variety of different attribute selections. This may be delivered in the form of statistics and/or any other techniques. Even still, such advertisement analytics interface may also be configured to track statistics with respect to message delivery. Of course, such analytics may also be based, at least in part, on data collected from locations using techniques described in association with FIG. 14.

In other embodiments, the attribute interface 1600 may be a component of a social networking site, for allowing administrators and/or users to focus delivery or collection of data. In still other embodiments, the attribute interface 1600 may be a component of a governmental framework for providing emergency information. Of course, the attribute interface 1600 may be a component of any desired framework where location/service-based message delivery/collection/display is desired.

Figure 17:
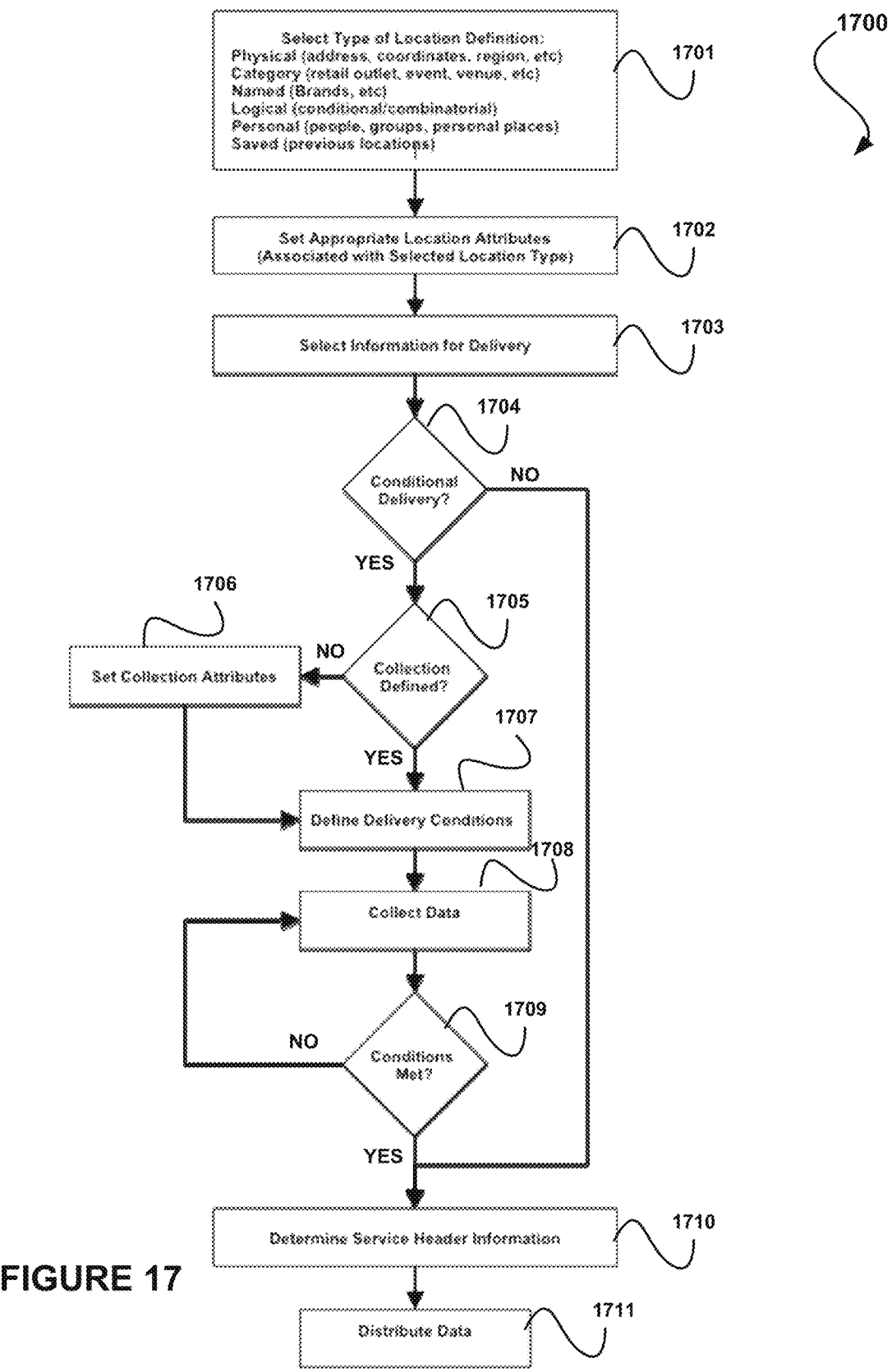
FIG. 17 illustrates a method for configuration of compound locations for information distribution using information collection, in accordance with yet another embodiment.

FIG. 17 illustrates a method 1700 for configuration of compound locations for information distribution using information collection, in accordance with yet another embodiment. As an option, the method 1700 may be carried out in the context of the architecture and environment of the previous Figures and/or any subsequent Figure(s). Of course, however, the method 1700 may be carried out in any desired environment. Again, the aforementioned definitions may equally apply to the description below.

It should be noted that the present method 1700 may be performed using a user interface capable of being used for configuring attributes (e.g. location/service including, but not limited to the examples described in connection with FIGS. 7-11, etc.) that may be associated with message delivery. Just by way of example, such user interface may be attribute interface 1600 described above with respect to FIG. 16, but use of others is contemplated.

As shown in operation 1701, a type of location definition is selected. For example, the type may be selected from physical locations, category locations, named locations, logical locations, personal locations, saved locations, etc. Location attributes for the selected location type are then set, as shown in operation 1702. The location attributes (e.g. coordinates, brands, etc.) may be specific to the location type, for example, as described above with reference to FIG. 16.

In operation 1703, information to be delivered is selected. The information may be any content desired to be delivered to mobile devices, for example. Further, it is determined whether the delivery is to be conditional (decision 1704). In one embodiment, this may include determining whether a user has selected an option that the delivery of the information be conditioned on one or more service attributes.

If it is determined that the delivery is not to be conditional, service header information is determined for the information (operation 1710) and the information is distributed (operation 1711). For example, the information may be distributed as described above with respect to FIG. 13, but other techniques are contemplated, as well.

Returning to decision 1704, if it is determined that the delivery is to be conditional, it is further determined in decision 1705 whether a collection is defined. The collection may be profile data that is desired to be collected (e.g. to be used as a basis for targeting mobile devices/associated users having such profile data when distributing the message). If it is determined that a collection is not defined, collection attributes are set (operation 1706). If it is determined that a collection is defined, or once the collection attributes are set, delivery conditions are defined, as shown in operation 1707. The delivery conditions may indicate the conditions under which the message is to be delivered.

Further, data is collected, as shown in operation 1708 (e.g. via the defined collection), and it is determined in decision 1709 whether the delivery conditions are met. If it is determined that the delivery conditions are not met, further data is collected. Once it is determined that the delivery conditions are met, service header information is determined for the message (operation 1710) and the message, having the location attributes, service headers, and selected information, is distributed accordingly.

Just by way of example, a data/content provider might configure the attributes to target a specialized message (e.g. advertisement, offer, coupon, etc.) to all registered users who are within 200 meters of any location of a particular brand of retail outlet. As a further example, the data/content provider might, through a location based data collection process, use the presence of females between 21 and 25 years old who list a particular style preference, and are within 200 meters of any location of a particular brand of retail outlet as the basis for then delivering a message to mobile devices associated with those specified people (e.g. advertisement, offer, coupon, etc.). Such preferences may be determined through a registration process (for example signing up for this service), or through other mechanisms such as selecting or opting in to the service from a social media service such as Pinterest, Facebook, Google Groups, etc., or via an opt-in process as part of a club or other membership/registration process. Such registrations may be physical or online.

In yet another example, the aforementioned method 1700 may also be used by individuals. Optionally, a user might subscribe to a social service that will use the location data collection process to determine what other service members are within a specified distance, and then use the data distribution process to notify one or more of those members about the presence of others. Such a service might, for example, be used to notify a member of a dating site that another member that meets the user's specified attribute profile(s) is in the same bar or other venue. Such a service might also include the ability to control the delivery of such messages by each recipient.

As a further option, an event may be triggered when another person or persons were located at a particular place. For example, a parent could set a trigger that was activated when one or more of their children were at a specific location, possibly at a specific time (e.g. home from school, or at after school sports practice or tutoring venues). Similarly, friends may be notified when they arrive at the same location.

Figure 18:
FIG. 18 illustrates various user information delivery interfaces, in accordance with still yet another embodiment.

FIG. 18 illustrates various user information delivery interfaces 1800, in accordance with still yet another embodiment. As an option, the interfaces 1800 may be implemented in the context of the architecture and environment of the previous Figures and/or any subsequent Figure(s). Of course, however, the interfaces 1800 may be carried out in any desired environment. Again, the aforementioned definitions may equally apply to the description below.

The user information delivery interfaces 1800 shown are examples of the messages that may be delivered to device devices by data/content providers. For example, the messages may include location based information which is only distributed to mobile devices associated with a relevant location and/or additional relevancy attributes.

As shown in FIG. 18, a notification of a store sale may be delivered to a target audience who are most likely to be interested in such sale and/or have an ability to access the store. Further, event information may be delivered to users who are most likely to be interested in attending the same and/or have a capability of doing so. Even still, an emergency alert may be sent to users who are most likely to be affected by an emergency or dangerous condition. Even still, users may be presented with messages including advertisements (and/or other inquiries, surveys, etc.) that allow for feedback in the form of a response (e.g. "No Thanks," "Yes," "Like," etc.). As an option, such feedback may be considered an "attribute" for use in subsequent data collection/delivery/display, etc.

Figure 19:
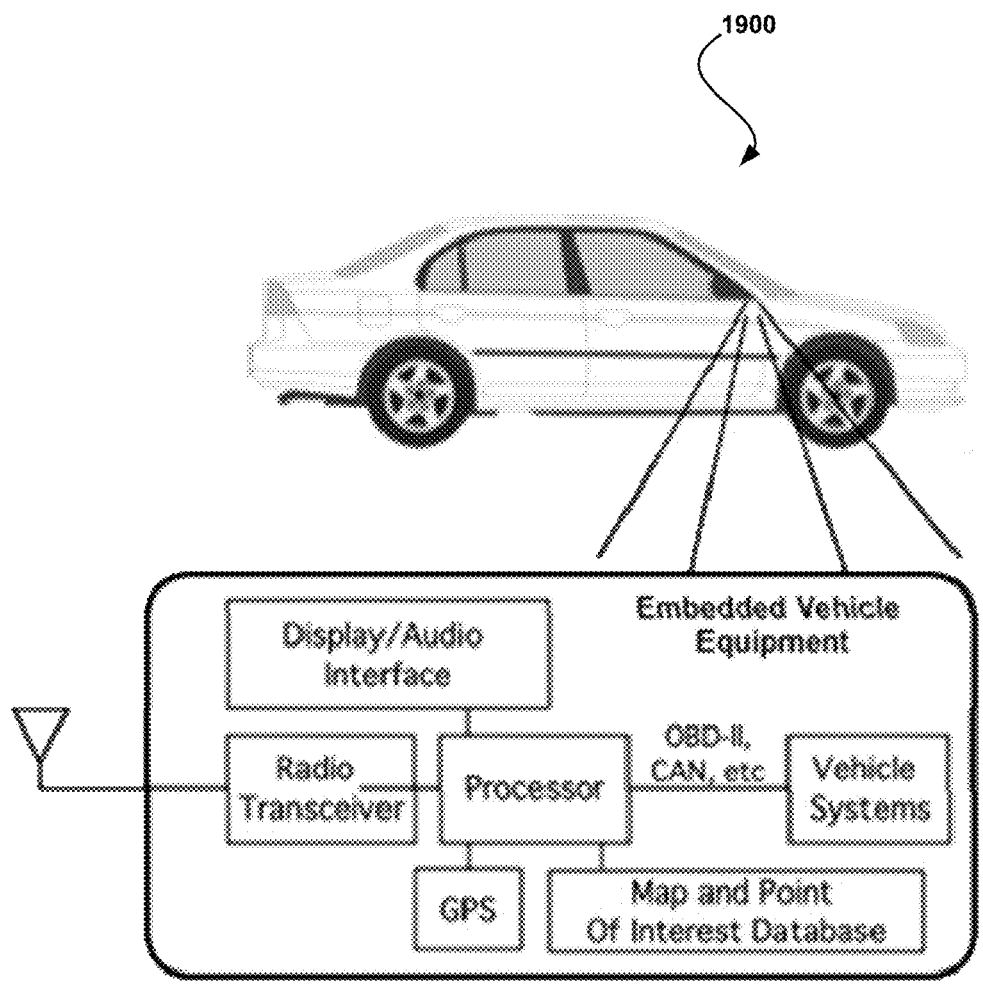
FIG. 19 illustrates an automotive system, in accordance with another embodiment.

FIG. 19 illustrates an automotive system 1900, in accordance with another embodiment. As an option, the automotive system 1900 may be implemented in the context of the architecture and environment of the previous Figures and/or any subsequent Figure(s). Of course, however, the automotive system 1900 may be implemented in any desired environment. Again, the aforementioned definitions may equally apply to the description below.

With the automotive system 1900, any of the message delivery and/or display, data collection, etc. disclosed herein may be carried out utilizing one or more components of the vehicular assembly of the automotive system, a separate mobile device (e.g. smartphone, tablet, etc.), and/or a combination thereof. For example, in one possible embodiment, the automotive system may perform any functionality independent of any separate mobile device. In another embodiment, however, one or more components of the separate mobile device (e.g. a communication channel, processing capability, etc.) may be used to perform a first portion of the functionality (e.g. receive message, process the message, etc.), while one or more components of the automotive system (e.g. a touchscreen, display, etc.) may be used to perform a second portion of the functionality (e.g. display the message, receive feedback in connection with the message, etc.).

In one embodiment, information distribution can be provided in vehicles. As shown, using an automotive system 1900, for example, information about events and other location oriented dynamic content might be delivered (e.g. as described above with reference to the previous Figure(s)) and presented to vehicle occupants using an augmented reality display system that would indicate the direction of such an event or location related to the information. Such a display might also be used to highlight specific landmarks associated with such information (e.g. buildings, venues, locals, signs, etc.) as illustrated in the automotive information delivery using augmented reality interface 2000 shown in FIG. 20.

In the context of the present automotive system 1900, a communication system (not shown) may be provided for enabling communication between a mobile device (not shown) and data/content providers/aggregators (not shown). For example, a mobile device may be capable of interfacing with a vehicle including various components of the vehicle. The mobile device may include any mobile device capable of interfacing with a vehicle including a lap-top computer, hand-held computer, mobile phone, personal digital assistant (PDA), a music player (e.g. a digital music player, etc.), a GPS device, etc.

In various embodiments, the mobile device may communicate with a vehicular assembly system (e.g. a communication and entertainment system, etc.) corresponding to the vehicle via a wireless connection (e.g. Bluetooth, etc.), or via a cable connection (e.g. a USB cable, a serial cable, etc.). As an option, the mobile device may interface with the communication and entertainment system vehicle utilizing an I/O port of the vehicle. In various embodiments, the I/O port may include a serial port, a USB port, FireWire/i.LINK ports, MirrorLink ports, terminal mode ports, etc. In one embodiment, the I/O port may include a wireless communication port.

Using this interface, the mobile device may interface with various components and functionality of the vehicle (which may or may not be shown in FIG. 19), such as an onboard computer system including a processor, memory (e.g. DRAM, flash memory, etc.), an onboard navigation system, displays (e.g. a central display, and one or more passenger displays, etc.), audio communication devices (e.g. speakers, a microphone, etc.), and various other components and functionality of the vehicle included in the vehicular assembly system. The interface may also allow a user of the vehicle to access and/or control the mobile device utilizing controls associated with the vehicle, such as steering wheel, dashboard, and radio controls. Additionally, the user may access and/or control the mobile device utilizing the microphone through voice commands.

Using these components and controls, a user may access and utilize one or more wireless networks associated with the mobile device. Coupled to the networks may be servers which are capable of communicating over the networks. Also coupled to the networks and the servers may be a plurality of clients.

Such servers and/or clients may each include a desktop computer, lap-top computer, hand-held computer, mobile phone, personal digital assistant (PDA), peripheral (e.g. printer, etc.), any component of a computer, and/or any other type of logic. In order to facilitate communication among the networks, at least one gateway is optionally coupled therebetween.

It should be noted that the computer system of the vehicle may include various software and applications for facilitating communication between the vehicle and the mobile device. For example, in various embodiments, the vehicle computer system may include an operating system (e.g. Windows Mobile, Linux, etc.), embedded speech recognition software, telephone call steering systems, automated telephone directory services, character recognition software, and imaging software.

Figure 20:
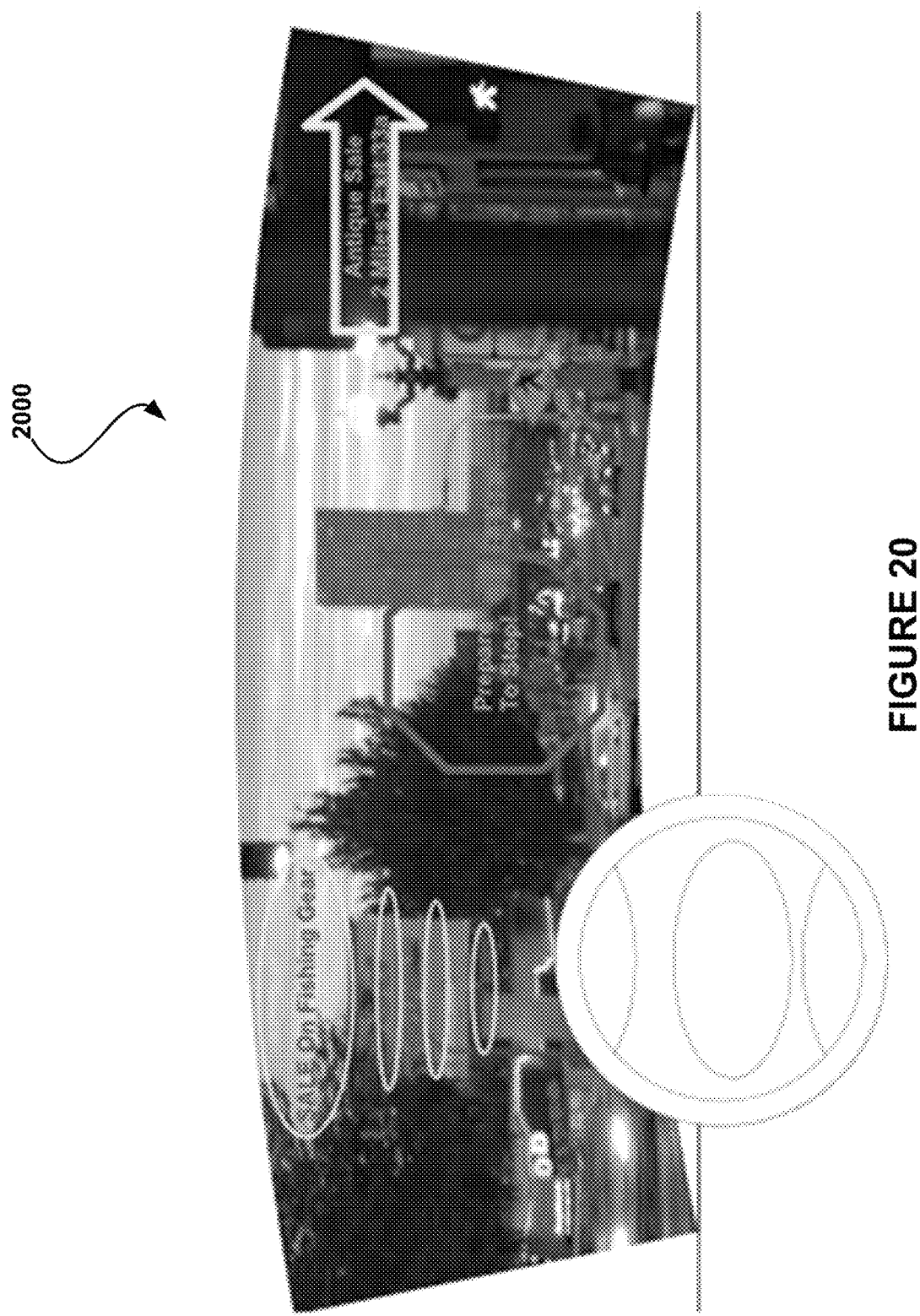
FIG. 20 illustrates automotive information delivery using augmented reality, in accordance with yet another embodiment.

FIG. 20 illustrates an automotive augmented reality interface 2000, in accordance with another embodiment. As an option, the automotive interface 2000 may be implemented in the context of the architecture and environment of the previous Figures and/or any subsequent Figure(s). Of course, however, the automotive interface 2000 may be implemented in any desired environment. Again, the aforementioned definitions may equally apply to the description below.

In various embodiments, the interface 2000 and related supported components may be equipped to receive and/or display and/or collect (e.g. via hand gestures, etc.) messages in any manner that is disclosed herein above in connection with other mobile devices, etc. As a further option, in view of a larger size of the interface 2000 (as compared with a phone, for example), additional attributes may be used to indicate a location and/or manner in which the messages are displayed. Further, such display may also be a function of a direction of travel of the vehicle (e.g. so that any directional information in the form of arrows or the like is properly oriented, etc.).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
 a building including a plurality of facilities therein each including at least one broadcast short-range communications unit having a fixed location and configured to:
 generate one or more broadcast messages including an address portion and a plurality of fields including at least one field with at least one value, the one or more broadcast messages including a first identifier field with the at least one value being the same for each of at least a first subset of a plurality of the broadcast short-range communications units in the building, and a second identifier field with an other value that is different for each of at least a second subset of the plurality of the broadcast short-range communications units in the building, broadcast, via a first wireless communications protocol, the one or more broadcast messages including the address portion, the plurality of fields, and the at least one value, for intended receipt by a plurality of mobile devices in a communication range of the at least one broadcast short-range communications unit, and re-broadcast, via the first wireless communications protocol, the one or more broadcast messages including the address portion, the plurality of fields, and the at least one value, for intended receipt by the plurality of mobile devices in the communication range of the at least one broadcast short-range communications unit;

code configured to be executed by at least one of the plurality of mobile devices, the code, when executed, configured to:

cause display, via a display of the at least one mobile device, of an option for causing visual information to be output via the at least one mobile device, receive an indication of a user input for the option displayed via the display of the at least one mobile device, receive an indication of a receipt, from the at least one broadcast short-range communications unit and via the first wireless communications protocol, of the one or more broadcast messages including the address portion, the plurality of fields, and the at least one value, and cause to be sent, from the at least one mobile device and via a second wireless communications protocol and an Internet Protocol, at least one message; and at least one server configured to:

receive, from the at least one mobile device and via the Internet protocol, the at least one message, in response to the receipt, from the at least one mobile device and via the Internet protocol, of the at least one message: retrieve location-relevant information, and after the location-relevant information is retrieved, cause to be sent, from the at least one server to the at least one mobile device and via the Internet protocol, a response message including the location-relevant information;

said code, when executed, further configured to:

receive, from the at least one server and via the second wireless communications protocol and the Internet Protocol, the response message including the location-relevant information, and after the receipt, from the at least one server and via the second wireless communications protocol, of the response message including the location-relevant information: cause to be output, via the at least one mobile device, the visual information, based on the location-relevant information and whether a threshold has been met, the visual information being based on user-specific demographic or preference information;

wherein the system is configured such that the location-relevant information includes at least one image, and the system is further configured such that, after the indication of the user input is received and after the output of the visual information is caused, subsequent output of different visual information, that is brand- or product-specific, is caused as the at least one mobile device is moved among the plurality of the facilities of the building.

2. The system of claim 1, wherein the at least one broadcast short-range communications unit is incapable of accessing the location-relevant information.

3. The system of claim 1, wherein the system is configured such that the at least one value of the one or more of the plurality of fields is associated with the location-relevant information for permitting the location-relevant information to be retrieved based on the at least one value.

4. The system of claim 3, wherein at least one of:

a location of the at least one mobile device is capable of being identified by cooperating with a plurality of wireless components utilizing received signal strength measurements;

the second wireless communications protocol includes a WiFi wireless communications protocol;

the second wireless communications protocol includes a cellular wireless communications protocol;

at least one of the plurality of fields is part of a header;

at least one of the plurality of fields is capable of having a null value;

the plurality of fields are part of a header;

the plurality of fields are portions of at least one identifier;

the plurality of fields are portions of at least one identifier;

the at least one value takes the same form in connection with the one or more broadcast messages and the at least one message;

the indication of the user input includes a signal that results from a detection of the user input;

the indication of the receipt of the one or more broadcast messages includes a signal that results from the receipt of the one or more broadcast messages;

the indication of the receipt of the one or more broadcast messages, includes the at least one value;

the indication of the receipt of the one or more broadcast messages, includes only the at least one value;

the indication of the receipt of the one or more broadcast messages includes the address portion, the plurality of fields, and the at least one value;

the at least one value includes an address;

the at least one value includes an identifier;

the option is displayed in connection with a message and the user input involves a contact to a predetermined location;

the option involves a preference setting;

the option is associated with a use of the code;

the option for causing to be output, via the at least one mobile device, the visual information, is for allowing the user to control whether the system operates to output the visual information;

the option for causing to be output, via the at least one mobile device, the visual information, is for allowing the user to control whether the system operates to output the visual information in connection with the building;

the option for causing to be output, via the at least one mobile device, the visual information, is for allowing the user to control whether the system operates to send the at least one message and receive the location-relevant information, in order to output the visual information in connection with the building;

the at least one message is caused to be sent before the receipt of the indication of the user input;

the at least one message is caused to be sent after the receipt of the indication of the user input;
the at least one message is caused to be sent in response to the receipt of the indication of the user input;
the at least one message includes the at least one value;
the at least one message is based on the at least one value;
the at least one message is independent of the at least one value;
the at least one message is used in retrieving the location-relevant information by being used to locate the location-relevant information;
the location-relevant information is retrieved in response to the receipt, from the at least one mobile device and via the Internet protocol, of the at least one message, with no intermediate operation therebetween;
the location-relevant information is retrieved in response to the receipt, from the at least one mobile device and via the Internet protocol, of the at least one message, with at least one intermediate operation therebetween;
the one or more broadcast messages are received and the at least one message is caused to be sent via the same network I/O unit;
the one or more broadcast messages are received and the at least one message is caused to be sent via different network I/O units;
the at least one broadcast short-range communications unit is configured to automatically generate the one or more broadcast messages for an unsolicited broadcast thereof;
the Internet protocol includes a Transmission Control Protocol/Internet protocol;
the plurality of facilities include one or more spaces;
the plurality of facilities include one or more departments;
the building includes a retail space;
the building includes a retail space in a shopping mall;
the visual information, the location-relevant information, and the causing to be output are mobile device-independent;
the user-specific demographic or preference information includes the demographic information;
the user-specific demographic or preference information includes the preference information;
the user-specific demographic or preference information includes the demographic and the preference information;
the visual information is based on the user-specific demographic or preference information by being retrieved based on the user-specific demographic or preference information;
the visual information is based on the user-specific demographic or preference information by being selected based on the user-specific demographic or preference information;
the visual information is based on the user-specific demographic or preference information by being conditionally output based on the user-specific demographic or preference information;
the different visual information is brand-specific;
the different visual information is product-specific;
the different visual information is brand and product-specific;
the visual information is caused to be output based on the whether the threshold has been met, by being caused to be output if the threshold is met;
the visual information is caused to be output based on the whether the threshold has been met, by being caused to be output if the threshold is not met;
the threshold is utilized to determine a relevance of the visual information;
the threshold relates to hardware of the at least one mobile device;
the threshold relates to software of the at least one mobile device;
the threshold relates to the code;
the threshold relates to use of the code;
the threshold relates to prior use of the code;
the threshold indicates use of the code to display the visual information;
the threshold is a number of devices;
the threshold is a number of users;
the threshold is a number of social network site members;
the threshold relates to accumulated data associated with a parameter;
the first broadcast short-range communications unit includes a dedicated unit;
the first broadcast short-range communications unit includes a network information outlet;
the first broadcast short-range communications unit includes a dedicated short-range communications roadside unit;
the at least one broadcast short-range communications unit is capable of only transmitting;
the at least one broadcast short-range communications unit is capable of transmitting and receiving;
a range of the at least one broadcast short-range communications unit is that mandated by a Bluetooth wireless communications protocol;
the fixed location results from an installation of the at least one broadcast short-range communications unit at a location;
the fixed location results from an installation of the at least one broadcast short-range communications unit, which is initially portable, at a particular location;
the first wireless communications protocol includes a Bluetooth protocol;
the causing to be output is carried out, at least in part, by the at least one mobile device and is caused, at least in part, by the code;
the causing to be output is carried out, at least in part, by the at least one mobile device and is supported, at least in part, by the code;
the location-relevant information is retrieved, by using the at least message to retrieve the location-relevant information;
the code is part of an application;
the location-relevant information includes information that is relevant to a location;
the location-relevant information includes information that is relevant to a brand located at a location;
the location-relevant information includes information that is relevant to a product located at a location;
the location-relevant information is associated with the at least one value, by being retrieved based on the at least one value;
the location-relevant information is associated with the at least one value, so as to be retrieved from memory on the at least one mobile device based on the at least one value;
the location-relevant information is associated with the at least one value, so as to be retrieved from memory on the at least one server based on the at least one value;
the visual information is caused to be output based on the location-relevant information, by including at least a portion of the location-relevant information;

the visual information is caused to be output based on the location-relevant information, by being triggered in response to the receipt of the response message including the location-relevant information;

the one or more broadcast messages, the at least one message, and the response message are of a different format;

the one or more broadcast messages and the at least one message are identical;

the one or more broadcast messages, the at least one message, and the response message are the same in at least one aspect;

the one or more broadcast messages, the at least one message, and the response message are different in at least one aspect;

the visual information is derived from the location-relevant information;

the visual information is based on the location-relevant information;

the visual information includes at least a portion of the location-relevant information;

the visual information includes at least one of a plurality of different images, and at least one of: at least one of the different images is accessible using the visual information, at least one of the different images is accessible via the visual information, at least one of the different images is accessible by being included in the visual information, or each of the different images is accessible via different visual information;

the option includes a selectable option for information delivery being conditioned;

the option includes a selectable option for information delivery being conditioned on a service attribute;

the option includes a selectable option related to at least one aspect of information delivery;

the option is caused to be displayed after the receipt of the indication of the receipt of the one or more broadcast messages;

the option is caused to be displayed before the receipt of the indication of the receipt of the one or more broadcast messages;

the output of the visual information is caused after the receipt of the response message, by being caused in response to the receipt of the response message;

the output of the visual information is caused in response to the receipt of the indication of the receipt of the one or more broadcast messages, by retrieving the location-relevant information from memory on the at least one mobile device in response to the receipt of the indication of the receipt of the one or more broadcast messages;

the output of the visual information is caused in response to the receipt of the indication of the receipt of the one or more broadcast messages, by retrieving the location-relevant information from memory on the at least one server in response to the receipt of the indication of the receipt of the one or more broadcast messages;

the one or more broadcast messages are broadcasted and re-broadcasted for intended receipt by the plurality of mobile devices in the communication range of the at least one broadcast short-range communications unit, where the one or more broadcast messages are broadcasted and re-broadcasted for intended receipt by the plurality of mobile devices at the same time;

the one or more broadcast messages are broadcasted and re-broadcasted for intended receipt by the plurality of mobile devices in the communication range of the at least one broadcast short-range communications unit, where the one or more broadcast messages are broadcasted and re-broadcasted for intended receipt by the plurality of mobile devices at different times;

the causation of the output of the visual information is triggered based on a location of the at least one mobile device;

the causation of the output of the visual information is triggered based on the receipt of the indication of the receipt of the one or more broadcast messages;

the causation of the output of the visual information is conditioned on the receipt of the indication of the user input;

the at least one server includes a proxy server; or the system further comprises the at least one mobile device.

5. The system of claim 1, and further comprising a computer configured to display at least one configuration interface for receiving an administrator input in connection with the other value.

6. The system of claim 1, wherein the at least one broadcast short-range communications unit uses the first wireless communications protocol so as to have a first range that is shorter than a second range of the at least one mobile device when the at least one mobile device uses the second wireless communications protocol.

7. The system of claim 1, wherein the system is configured such that, after the receipt of the indication of the user input, the visual information is automatically caused to be output, in response to the receipt of the indication of the receipt of the one or more broadcast messages that are broadcasted after the receipt of the indication of the user input.

8. The system of claim 1, wherein the system is configured such that the visual information is automatically caused to be output without requiring further communication with the at least one broadcast short-range communications unit, after the receipt of the indication of the receipt of the one or more broadcast messages.

9. The system of claim 1, wherein the system is configured such that the causing to be output is based on user feedback information received from a user of the at least one mobile device.

10. The system of claim 1, wherein the system is configured such that the one or more broadcast messages are re-broadcasted at predetermined intervals.

11. The system of claim 1, wherein the system is configured such that the subsequent output of the different visual information is capable of being caused without additional user input after the user input.

12. The system of claim 1, wherein the code, when executed, is configured to cause the at least one message to be sent and the response message to be received, before the receipt of the indication of the receipt of the one or more broadcast messages.

13. The system of claim 1, wherein the code, when executed, is configured to cause the at least one message to be sent, in response to the receipt of the indication of the receipt of the one or more broadcast messages.

14. The system of claim 1, wherein the building includes a shopping mall, and the plurality of facilities include different private facilities associated with different brands, and further include at least one public food court that includes at least one public food court broadcast short-range communications unit.

15. The system of claim 1, wherein the building includes a retail space, and the plurality of facilities have different locations in the retail space and are associated with different product types.

16. The system of claim 1, wherein the system is configured such that the user-specific demographic or preference information is received based on particular user input from a user of the at least one mobile device.

17. The system of claim 1, wherein the system is configured such that the user-specific demographic or preference information includes age information, gender information, hobby information, and interest information.

18. The system of claim 1, wherein the system is configured such that the visual information is caused to be output based on whether the threshold has been met, by being caused to be output if the threshold is not met.

19. The system of claim 1, wherein the system is configured such that the visual information is caused to be output based on the whether the threshold has been met, by being caused to be output if the threshold is not met, where the threshold relates to prior use of the code.

20. The system of claim 1, wherein the first wireless communications protocol is a personal area network protocol and the second wireless communications protocol is a WiFi protocol or a cellular protocol.

21. A system, comprising:
a building including a plurality of facilities therein each including a broadcast short-range communications means having a fixed location and configured to:
generate one or more broadcast messages including an address portion and a plurality of fields including at least one field with at least one value, the one or more broadcast messages including a first identifier field with the at least one value being the same for each of at least a first subset of a plurality of the broadcast short-range communications means in the building, and a second identifier field with an other value that is different for each of at least a second subset of the plurality of the broadcast short-range communications means in the building,
broadcast, via a first wireless communications protocol, the one or more broadcast messages including the address portion, the plurality of fields, and the at least one value, for intended receipt by a plurality of mobile devices in a communication range of the broadcast short-range communications means, and
re-broadcast, via the first wireless communications protocol, the one or more broadcast messages including the address portion, the plurality of fields, and the at least one value, for intended receipt by the plurality of mobile devices in the communication range of the broadcast short-range communications means;
code means configured to be executed by at least one of the plurality of mobile devices, the code means, when executed, configured to:
cause display, via a display of the at least one mobile device, of an option for causing to be output, via the at least one mobile device, visual information,
receive an indication of a user input for the option displayed via the display of the at least one mobile device,
receive an indication of a receipt, from the broadcast short-range communications means and via the first wireless communications protocol, of the one or more broadcast messages including the address portion, the plurality of fields, and the at least one value, and
cause to be sent, from the at least one mobile device and via a second wireless communications protocol and an Internet Protocol, at least one message; and
at least one server means configured to:
receive, from the at least one mobile device and via the Internet protocol, the at least one message,
in response to the receipt, from the at least one mobile device and via the Internet protocol, of the at least one message: retrieve location-relevant information, and
after the location-relevant information is retrieved, cause to be sent, from the at least one server means to the at least one mobile device and via the Internet protocol, a response message including the location-relevant information;
said code means, when executed, further configured to:
receive, from the at least one server means and via the second wireless communications protocol and the Internet Protocol, the response message including the location-relevant information, and
after the receipt, from the at least one server means and via the second wireless communications protocol, of the response message including the location-relevant information: cause, utilizing the code means, to be output, via the at least one mobile device, the visual information based on the location-relevant information and whether a threshold has been met, the visual information being based on user-specific demographic or preference information;
wherein the system is configured such that the location-relevant information includes at least one image, and the system is further configured such that, after the indication of the user input is received and after the output of the visual information is caused, subsequent output of different visual information, that is brand- or product-specific, is caused as the at least one mobile device is moved among the plurality of the facilities of the building.

22. The system of claim 21, wherein the first wireless communications protocol is a sensor network protocol and the second wireless communications protocol is a WiFi protocol or a cellular protocol.

23. A computer-implemented method, comprising:
providing at least one broadcast short-range communications unit configured to:
generate one or more broadcast messages including an address portion and a plurality of fields including at least one field with at least one value, the one or more broadcast messages including a first identifier field with the at least one value being the same for each of at least a first subset of a plurality of the broadcast short-range communications units in a building, and a second identifier field with an other value that is different for each of at least a second subset of the plurality of the broadcast short-range communications units in the building,
broadcast, via a first wireless communications protocol, the one or more broadcast messages including the address portion, the plurality of fields, and the at least one value, for intended receipt by a plurality of mobile devices in a communication range of the at least one broadcast short-range communications unit, and
re-broadcast, via the first wireless communications protocol, the one or more broadcast messages including the address portion, the plurality of fields, and the at least one value, for intended receipt by the plurality of mobile devices in the communication range of the at least one broadcast short-range communications unit;

providing code configured to be executed by at least one of the plurality of mobile devices, the code, when executed, configured to:

cause display, via a display of the at least one mobile device, of an option for causing to be output, via the at least one mobile device, visual information, receive an indication of a user input for the option displayed via the display of the at least one mobile device, receive an indication of a receipt, from the at least one broadcast short-range communications unit and via the first wireless communications protocol, of the one or more broadcast messages including the address portion, the plurality of fields, and the at least one value, and cause to be sent, from the at least one mobile device and via a second wireless communications protocol and an Internet Protocol, at least one message; and providing access to at least one server configured to:

receive, from the at least one mobile device and via the Internet protocol, the at least one message, in response to the receipt, from the at least one mobile device and via the Internet protocol, of the at least one message: retrieve location-relevant information, and after the location-relevant information is retrieved, cause to be sent, from the at least one server to the at least one mobile device and via the Internet protocol, a response message including the location-relevant information;

said code, when executed, further configured to:

receive, from the at least one server and via the second wireless communications protocol and the Internet Protocol, the response message including the location-relevant information, and after the receipt, from the at least one server and via the second wireless communications protocol, of the response message including the location-relevant information: cause to be output, via the at least one mobile device, the visual information based on the location-relevant information and whether a threshold has been met, the visual information being based on user-specific demographic or preference information;

wherein the location-relevant information includes at least one image, and after the indication of the user input is received and after the output of the visual information is caused, subsequent output of different visual information, that is brand- or product-specific, is caused as the at least one mobile device is moved.

24. The computer-implemented method of claim 23, wherein the first wireless communications protocol is an 802.15 network protocol and the second wireless communications protocol is a WiFi protocol or a cellular protocol.

25. A non-transitory computer-readable media storing computer instructions that, when executed by one or more processors of at least one mobile device, cause the at least one mobile device to:

receive an indication of a receipt of a broadcast, from at least one broadcast short-range communications unit via a first wireless communications protocol, of one or more broadcast messages including an address portion and a plurality of fields including at least one field with at least one value, for intended receipt by the at least one mobile device when in a communication range of the at least one broadcast short-range communications unit, the one or more broadcast messages including a first identifier field with the at least one value being the same for each of at least a first subset of a plurality of the broadcast short-range communications units in a building, and a second identifier field with an other value that is different for each of at least a second subset of the plurality of the broadcast short-range communications units in the building;

receive an indication of a receipt of a re-broadcast, from the at least one broadcast short-range communications unit via the first wireless communications protocol, of the one or more broadcast messages including the address portion, the plurality of fields, and the at least one value, for intended receipt by the at least one mobile device when in the communication range of the at least one broadcast short-range communications unit;

cause display, via a display of the at least one mobile device, of an option;

receive an indication of a user input for the option displayed via the display of the at least one mobile device;

cause to be sent, from the at least one mobile device to at least one server via a second wireless communications protocol and an Internet Protocol, at least one message;

receive, from the at least one server via the second wireless communications protocol and the Internet Protocol, a response message including location-relevant information that includes at least one image and that is brand- or product-specific;

after the receipt, from the at least one server via the second wireless communications protocol, of the response message including the location-relevant information: cause to be output, via the at least one mobile device, the at least one image; and after the indication of the user input is received and after the output of the at least one image is caused, cause to be output one or more different images as the at least one mobile device is moved based on whether a threshold has been met, the one or more different images being based on user-specific demographic or preference information.

26. The non-transitory computer-readable media of claim 25, wherein the user-specific demographic or preference information is received based on user input from a user of the at least one mobile device.

27. The non-transitory computer-readable media of claim 26, wherein the user-specific demographic or preference information includes age information, gender information, hobby information, and interest information.

* * * * *